United States Patent [19]

Hayashi et al.

[11] Patent Number: 5,591,100

[45] Date of Patent: Jan. 7, 1997

[54] CONTINUOUSLY VARIABLE TRANSMISSION VEHICLE

[75] Inventors: Akira Hayashi; Kunihiko Tanaka; Goroei Wakatsuki, all of Saitama-ken, Japan

[73] Assignee: Honda Giken Kogyo Kabushiki Kaisha, Tokyo, Japan

[21] Appl. No.: 616,766

[22] Filed: Mar. 15, 1996

Related U.S. Application Data

[63] Continuation of Ser. No. 64,157, filed as PCT/JP91/01585, Nov. 19, 1991.

[30] Foreign Application Priority Data

Nov. 20, 1990 [JP] Japan ..................... 2-315018

[51] Int. Cl.$^6$ .............. F16H 9/18; F16H 61/00
[52] U.S. Cl. ............. 477/44; 474/18; 475/210
[58] Field of Search .............. 477/44; 475/210; 474/11, 12, 18, 25, 26, 39, 69, 70

[56] References Cited

U.S. PATENT DOCUMENTS

| | | | |
|---|---|---|---|
| 3,643,519 | 2/1972 | Ebersold | 474/18 |
| 4,036,068 | 7/1977 | Gilbert | 474/11 |
| 4,229,989 | 10/1980 | Tamura | 474/12 |
| 4,735,113 | 4/1988 | Yamamuro et al. | 74/866 |
| 4,964,841 | 10/1990 | Takayama et al. | 474/11 |
| 5,073,859 | 12/1991 | Suzuki | 364/424.1 |
| 5,334,103 | 8/1994 | Gryspeerdt | 474/18 |

FOREIGN PATENT DOCUMENTS

| | | |
|---|---|---|
| 2203473 | of 1974 | France . |
| 2512911 | of 1983 | France . |
| 53-17886A | 2/1978 | Japan . |
| 58-17248 | 1/1983 | Japan . |
| 60-192156 | 9/1985 | Japan . |
| 404210156A | 7/1992 | Japan .................. 474/18 |

OTHER PUBLICATIONS

Donald Fink and Donald Christiansen, Electronics Engineers' Handbook, 1989, p. 7—7.
European Search Report.
English Language Abstracts of JP 60–192156, 2017268 and 58017248.

Primary Examiner—Charles A. Marmor
Assistant Examiner—Troy Grabow
Attorney, Agent, or Firm—Lyon & Lyon

[57] ABSTRACT

In a vehicle travelling by use of a travelling drive source such as an engine or a motor, the gear shift ratio of a continuously variable transmission B can be changed by increasing or decreasing the width of a groove in a driving pulley 19 of the continuously variable transmission B by a gear shift ratio changing device 61 using a motor 62 as a drive source. The motor 62 is controlled on the basis of output signals from a throttle opening degree sensor, an engine rotational speed sensor and a vehicle speed sensor, thereby enabling an energy-saving travelling suited to an operational condition of the travelling drive source or a travelling condition of the vehicle. The gear shift ratio changing device 61 is supported in a floating manner within a casing 3, 8 for the continuously variable transmission B. This achieves not only a reduction in size of a power unit, but also ensures that any operational sound of the motor 62 is prevented from leaking out, and any vibration from the engine or a wheel cannot be transmitted to the gear shift ratio changing device 61.

14 Claims, 22 Drawing Sheets

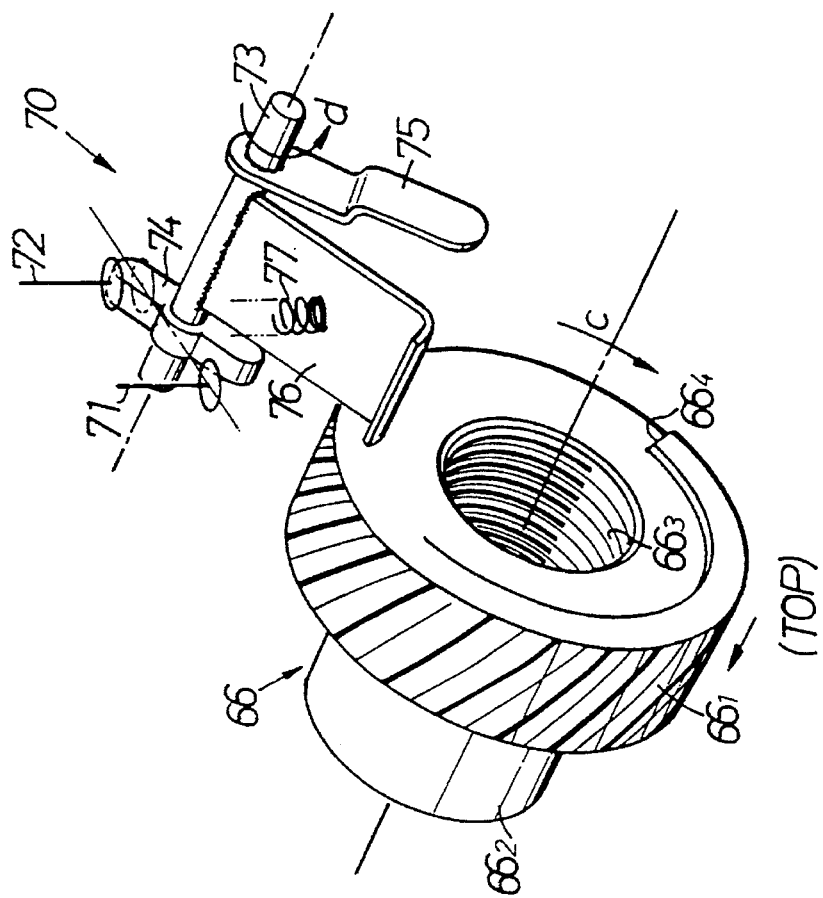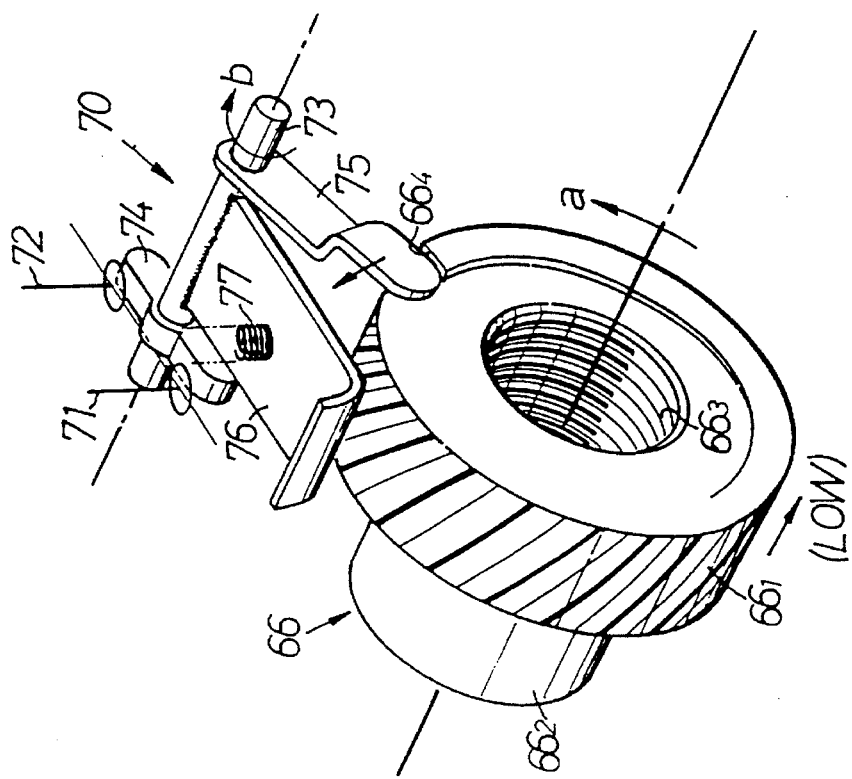

CONTINUOUSLY VARIABLE TRANSMISSION VEHICLE

This application is a continuation application of application Ser. No. 08/064,157, filed on Jul. 22, 1993.

TECHNICAL FIELD

The present invention relates to a continuously variable transmission in which a drive pulley mounted on an input shaft driven by an engine or a motor is connected through an endless belt with a driven pulley mounted on an output shaft, and the gear shift ratio can be changed by changing the width of grooves in both the pulleys.

TECHNICAL ISSUE

In the prior art, the gear shift ratio in such continuously variable transmission is controlled by use of a centrifugal governor mounted on a movable pulley half of the driving pulley. More specifically, the movable pulley half is provided with a weight which is movable radially outwardly by a centrifugal force, and a ramp plate for converting the movement of the weight into an axial thrust force, so that a thrust force corresponding to the number of revolutions of the engine and the wedge angle of the ramp plate is applied to the movable pulley half to control the tension of the endless belt. And the tension of the endless belt is balanced with a thrust force of a spring axially acting on a movable pulley half of the driven pulley thereby controlling the gear shift ratio (see Japanese Patent Publication Kokoku No.33588/88).

In the above prior art continuously variable transmission, the gear shift ratio is mechanically controlled by use of the centrifugal governor which depends on the rotational speed of a travelling drive source such as an engine and a motor and therefore, an energy-saving travelling suited to an operational condition of the engine or the motor or a travelling condition of a vehicle cannot necessarily be achieved.

It can be conceived to control the gear shift ratio of the continuously variable transmission in accordance with the operational condition of the engine or the motor or the travelling condition of the vehicle by the gear shift ratio changing means using an actuator as a drive source. However, such a construction suffers from a disadvantage that the size of the gear shift ratio changing means is generally enlarged, and it is difficult to mount such a large means to a small and light-weighted power unit of the vehicle.

DISCLOSURE OF THE INVENTION

With the foregoing in view, it is an object of the present invention to provide a continuously variable transmission for a vehicle, wherein the gear shift ratio changing means can be incorporated into a compact power unit and moreover, an energy-saving travelling can be realized.

To achieve the above object, according to a first feature of the present invention a continuously variable transmission is proposed including a driving pulley comprised of a stationary pulley half and a movable pulley half, both the pulley halves being mounted on an input shaft driven by a travelling drive source; a driven pulley comprised of a stationary pulley half and a movable pulley half, both the pulley halves of the driven pulley being mounted on an output shaft; and an endless belt wound around the driving pulley and the driven pulley; and a gear shift ratio changing means for controlling the gear shift ratio by changing the width of grooves in both the pulleys of the continuously variable transmission by a driving force of a motor, characterized in that the transmission further includes a control means for controlling the gear shift ratio changing means so as to change the widths of grooves in both the pulleys in accordance with the operational condition of the travelling drive source, and the gear shift ratio changing means is contained within a casing for containing the continuously variable transmission.

With the above construction, the operational sound emitted by the motor of the gear shift ratio changing means is shut away within the casing upon the change of the gear shift ratio, thereby contributing to a quiet travelling of the vehicle. In addition, since the gear shift ratio is controlled in accordance with the operational condition of the travelling drive source, it is possible to drive the vehicle in a minimum driving state of the travelling drive source upon cruising and therefore, the noise of the travelling vehicle can further be suppressed and the energy-saving travelling can be realized by an efficient utilization of the driving force.

According to a second feature of the present invention, in addition to the first feature, the gear shift ratio changing means is assembled in the form of a unit which is detachably supported in the casing.

The above construction ensures, not only that the assembling to the transmission and maintenance of the gear shift ratio changing means can easily be carried out, but also that the entire transmission can be made compact by efficiently utilizing a space inside the casing.

According to a third feature of the present invention, in addition to the first feature, the gear shift ratio changing means is supported in a floating relation to the casing.

The above construction ensures that a vibration cannot be transmitted from the casing to the gear shift ratio changing means, not only to insure a stable operation of the gear shift ratio changing means, but also to further effectively deaden the operational sound of the actuator for the gear shift ratio changing means.

According to a fourth feature of the present invention, in addition to the first feature, the widths of the grooves in the pulleys are varied on the basis of at least the rotational speed of the travelling drive source, the accelerator opening degree and the vehicle speed.

The above construction ensures that an appropriate shifting characteristic suited to an operational condition of the travelling drive source or a travelling condition of the vehicle can be obtained, thereby enabling a reduction in noise of the travelling drive source and a saving of the consumed energy.

According to a fifth feature of the present invention, in addition to the fourth feature, the widths of the grooves in the pulleys are varied on the basis of a deviation between the rotational speed of the travelling drive source and a target rotational speed searched in a table based on the accelerator opening degree and the vehicle speed.

The above construction enables the gear shift ratio of the continuously variable transmission to be controlled further properly.

According to a sixth feature of the present invention, in addition to the fourth feature, the output characteristic of a potentiometer for detecting the accelerator opening degree is set in a non-linear pattern, thereby changing the shifting characteristic of the continuously variable transmission relative to the accelerator opening degree.

The above construction ensures that any of various patterns can be provided to the shifting characteristic of the continuously variable transmission controlled by an output from the potentiometer.

According to a seventh feature of the present invention, in addition to the first feature, the movable pulley half of the driven pulley is moved toward and away from the stationary pulley half by the gear shift ratio changing means, and the movable pulley half of the driving pulley is biased toward the stationary pulley half by a spring.

The above feature ensures that even if the effective radius of the pulley is increased or decreased as the gear shift ratio is changed, an optimal thrust force can be always applied to prevent slippage of the endless belt, with the result that the load of the actuator for the gear shift ratio changing means is minimized, and a precise control with a good responsiveness is possible. In addition, since the spring is adapted to act on the driving pulley which makes the width of its groove small during cruising, any excessive repulsive force cannot be effected on the belt during cruising, thereby leading to an improvement in the endurance and the reducing of the thickness of the belt.

BRIEF DESCRIPTION OF THE DRAWINGS

The drawings illustrate embodiments of the present invention, wherein

FIG. 5 is enlarged perspective views of a limit switch mechanism;

BEST MODE FOR CARRYING OUT THE INVENTION

A first embodiment of the present invention will now be described in connection with the accompanying drawings.

Figure 1:
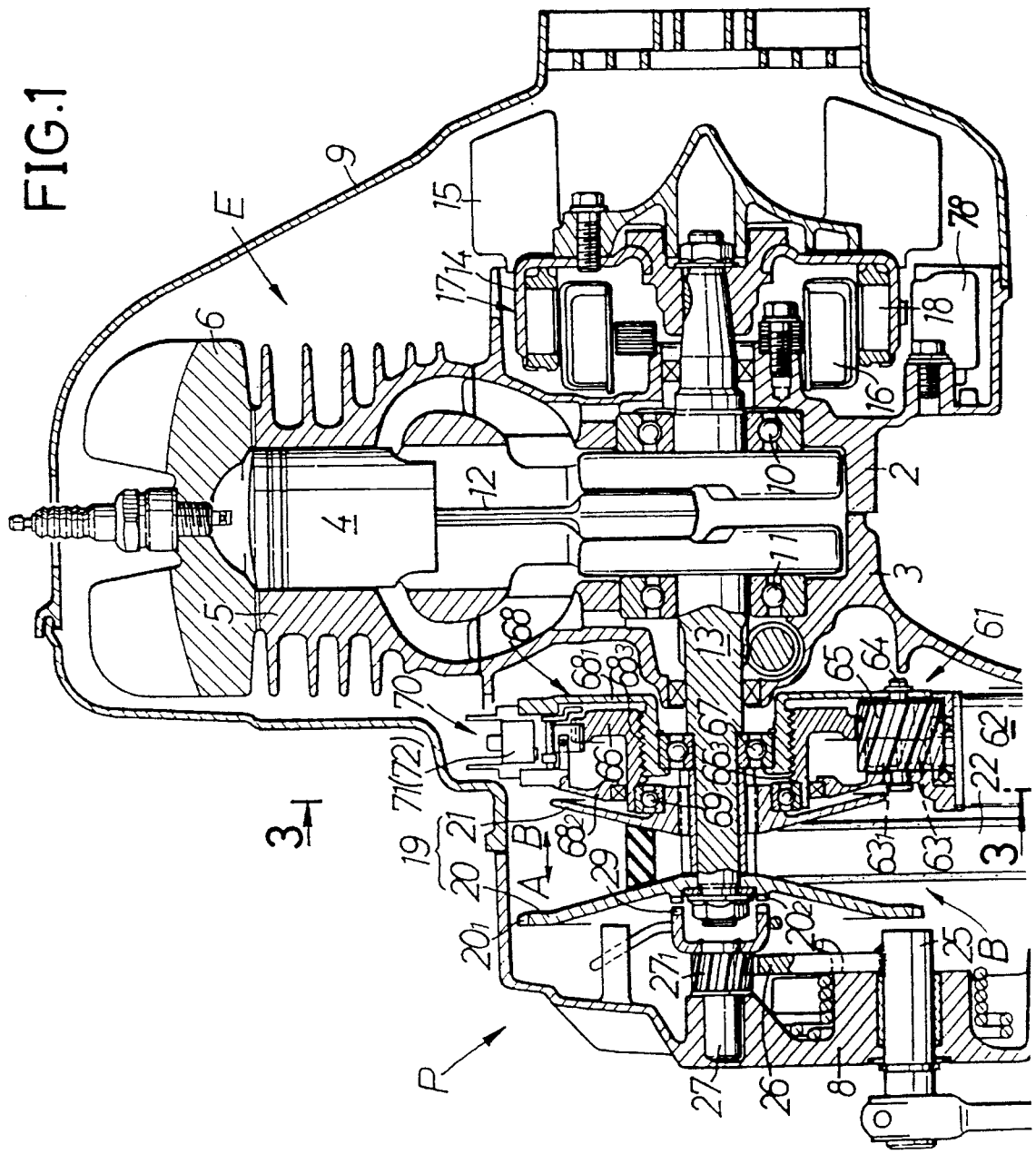
FIG. 1 is a first portion of a plan view of the entire belt type continuously variable transmission according to the first embodiment.
Figure 2:
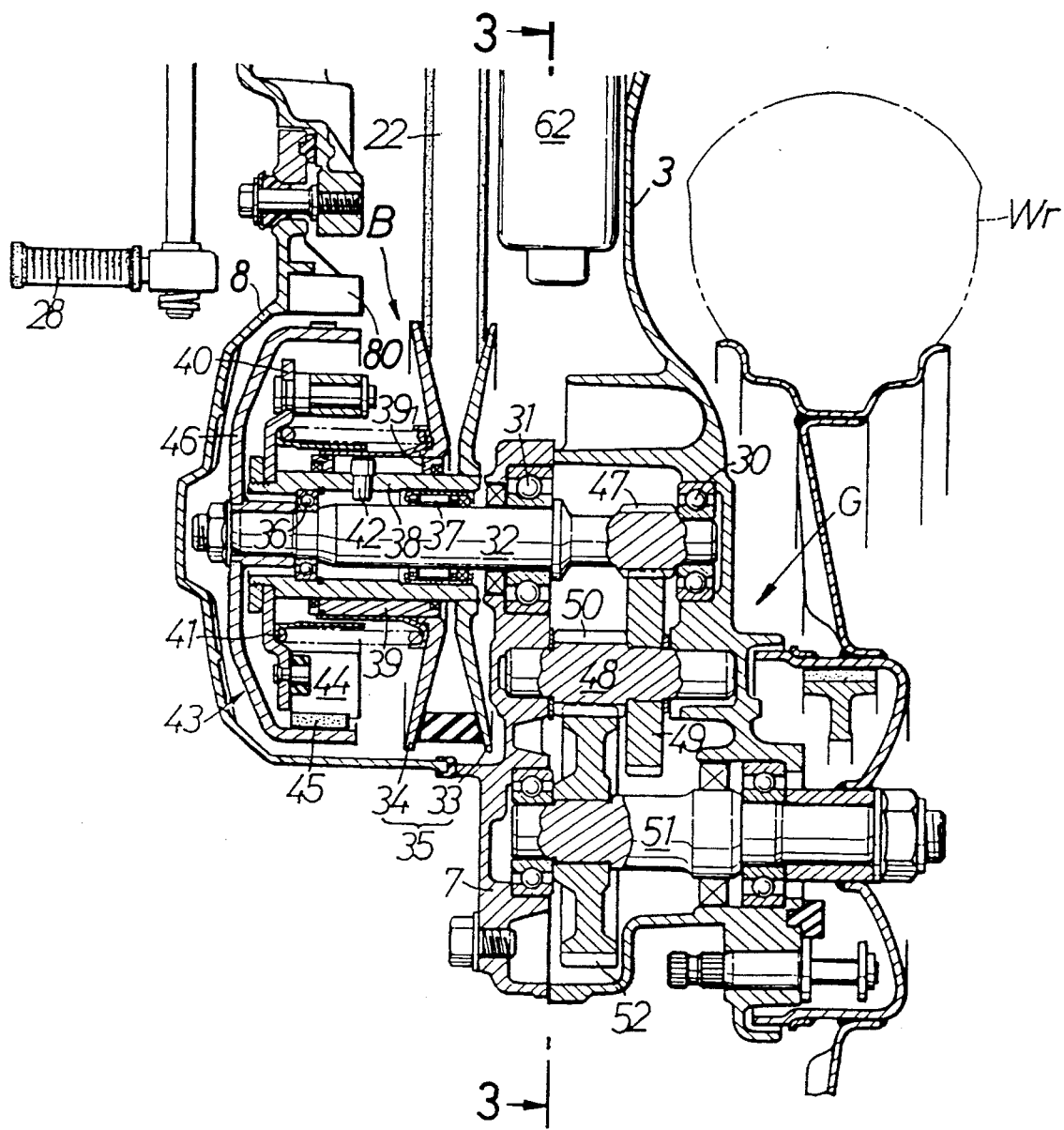
FIG. 2 is a second portion of the plan view.
Figure 3:
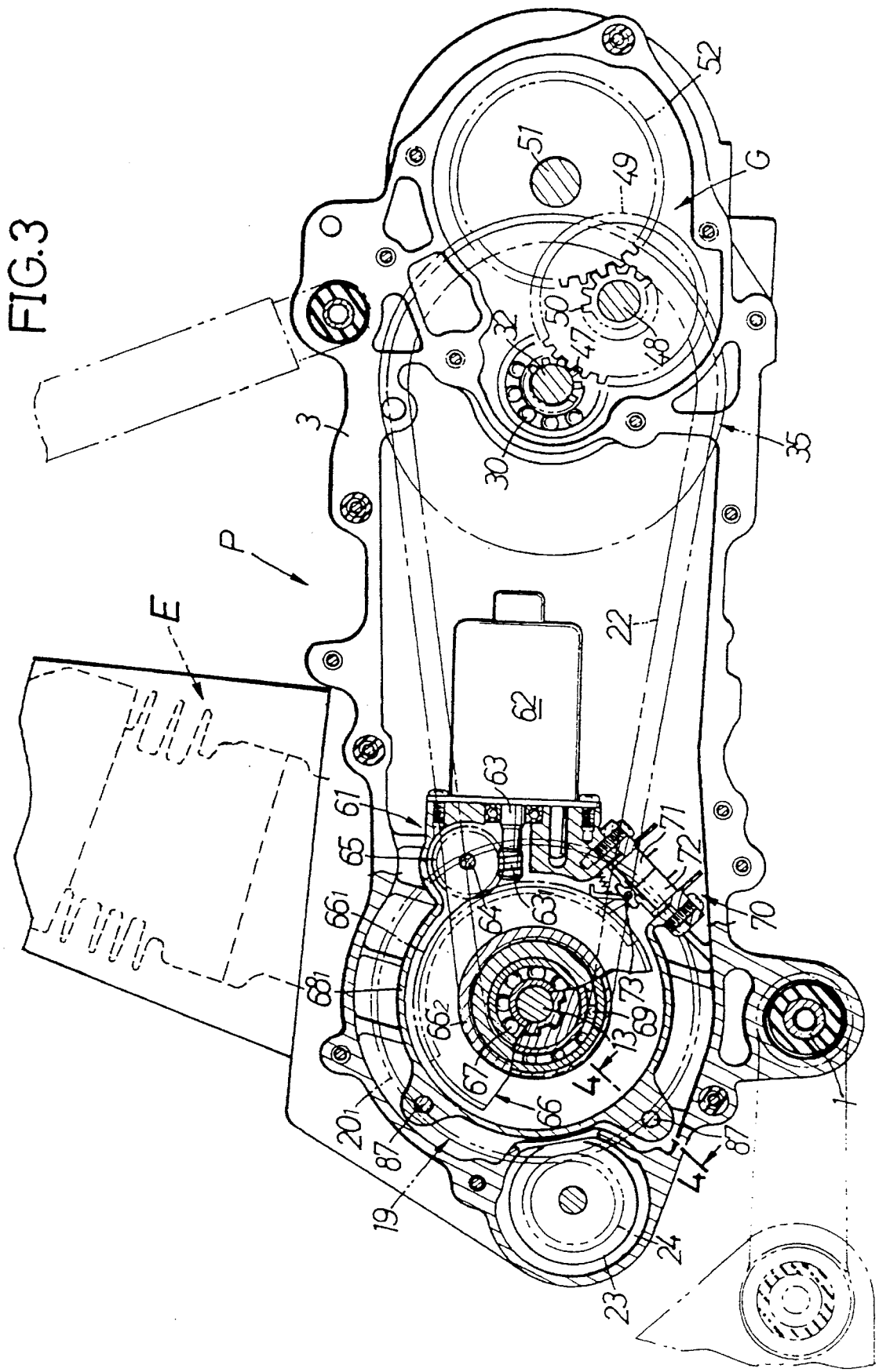
FIG. 3 is a sectional view taken along a line 3—3 in FIGS. 1 and 2.

Referring to FIGS. 1 to 3, a power unit P is vertically swingably mounted through a pivot 1 to a body frame of a vehicle such as a motorcycle and a three-wheel vehicle. A rear wheel Wr as a driven wheel is rotatably mounted at a rear end of the power unit P. The power unit P comprises a single-cylinder and two-cycle engine E for driving the rear wheel Wr, and a belt-type continuously variable transmission B and a gear reducer G for transmitting a driving force of the engine E to the rear wheel Wr.

A crank case of the engine E is comprised of a right case half 2 and a left case half 3 joined to each other on a center line of a vehicle body. A cylinder block 5 having a piston 4 slidably received therein is joined to an upper portion of the crank case and further, a cylinder head 6 is joined to an upper portion of the cylinder block 5. A rear left side of the left case half 3 is covered with a reducer cover 7, and the gear reducer G is contained inside the reducer cover 7.

A front left side of the left case half 3 and a left side of the reducer cover 7 are covered with a side cover 8, and the belt-type continuously variable transmission B is contained inside the side cover 8. Additionally, outer peripheries of the cylinder block 5 and the cylinder head 6 in the engine E and a right side of the right case half 2 are covered with an engine cover 9.

A crankshaft 13 is rotatably carried on ball bearings 10 and 11 provided in the right and left case halves 2 and 3, and is connected to the piston 4 through a connecting rod 12. The right end of the crankshaft 13 projects rightwardly from the right case half 2 and a flywheel 14 is secured to that right end. A fan 15 is integrally coupled to an outer side of the flywheel 14 for cooling the engine E, and magnets 18 are mounted on an inner periphery of the flywheel 14 and constitutes a generator 17 by cooperation with a stator coil 16 secured to the right case half 2.

The left end of the crankshaft 13 projects outwardly from the left case half 3 and a driving pulley 19 of the belt-type continuously variable transmission B is mounted at that left end. The driving pulley 19 is comprised of a stationary pulley half 20 secured to a tip end of the crankshaft 13 as an input shaft, and a movable pulley half 21 spline-connected to the crankshaft 13 for axial movement but preventing relative rotation therebetween. An endless belt 22 is wound around a V-shaped groove formed between the pulley halves 20 and 21.

A starter motor 23 is disposed in the vicinity of the crankshaft 13 and includes a well-known push-in type starter pinion 24, and a starter ring gear $20_1$ is formed on an outer periphery of the stationary pulley half 20 to lie in a path of the movement of the starter pinion 24. Thus, if the starter motor 23 is started, the push-in type starter pinion 24 protrudes to mesh with the starter ring gear $20_1$ to rotate the crankshaft 13 to which the stationary pulley half 20 integral with the starter gear $20_1$ is secured, thereby starting the engine E.

A drive helical gear 26 is secured to a kick shaft 25 carried by a wall of the side cover 8 and is meshed with a follower helical gear $27_1$ formed on a starter shaft 27 which is axially movably carried likewise by the wall of the side cover 8. A ratchet wheel 29 mounted at a tip end of the starter shaft 27 is meshably opposed to ratchet teeth $20_2$ formed on a side of the stationary pulley half 20. When the starter motor 23 is not used and if the kick shaft 25 is rotated by a kick pedal 28, the starter shaft 27 is rotated while being moved rightwardly through the drive helical gear 26 and the follower helical gear $27_1$ and therefore, the ratchet wheel 29 and the ratchet teeth $20_2$ are meshed with each other to drive the crankshaft 13, thereby providing a manual start of the engine E.

A driven pulley 35 comprised of a stationary pulley half 33 and a movable pulley half 34 is mounted on an output shaft 32 which is carried on the left case half 3 and the reducer cover 7 through ball bearings 30 and 31. The endless belt 22 is wound around a V-shaped groove formed between the pulley halves 33 and 34. An inner sleeve 38 integral with the stationary pulley half 33 is relatively rotatably mounted on an outer periphery of the output shaft 32 through a ball bearing 36 and a needle bearing 37. An outer sleeve 39 integral with the movable pulley half 34 is axially slidably fitted over an outer periphery of the inner sleeve 38. A spring 41 is mounted in a compressed manner between a clutch inner 40 formed at a left end of the inner sleeve 38 and the movable pulley half 34 for biasing the movable pulley half 34 toward the stationary pulley half 33. A pin 42 embedded in the inner sleeve 38 is engaged into a cam groove $39_1$ provided in the outer sleeve 39. A predetermined side pressure is provided to the endless belt 22 through the pulley halves 33 and 34 of the driven pulley 35 by an axial thrust force of the spring 41. When a power is transmitted from the endless belt 22 to the driven pulley 35, a reaction received by the cam groove $39_1$ from the pin 42 through the relative rotation of the movable and stationary pulley halves 34 and 33 causes the movable pulley half 34 to effect the axial thrust force toward the stationary pulley half 33, thereby providing a predetermined side pressure to the endless belt 22.

An automatic centrifugal clutch 43 for transmitting the rotation of the driven pulley 35 to the gear reducer G comprises a clutch weight 44 pivotally supported on a sidewall of the clutch inner 40 for radially swinging movement. A friction member 45 mounted on an outer periphery of the clutch weight 44 is opposed to an inner periphery of a clutch outer 46 secured to a left end of the output shaft 32. If the rotational speed of the driven pulley 35 is increased, the clutch inner 40 and the clutch outer 46 are coupled to each other through the friction member 45, and the driving force is transmitted to the output shaft 32.

An input gear 47 integrally formed on the output shaft 32 functioning as an input shaft of the gear reducer G is meshed with a first intermediate gear 49 of a large diameter provided on an intermediate shaft 48 supported between the left case half 3 and the reducer cover 7, and further, a second intermediate gear 50 of a small diameter provided on the intermediate shaft 48 is meshed with an output gear 52 of an output shaft 51 supported between the left case half 3 and the reducer cover 7. The rear wheel Wr is mounted on the output shaft 51 at its right end which projects to the outside from the left case half 3.

Figure 4:
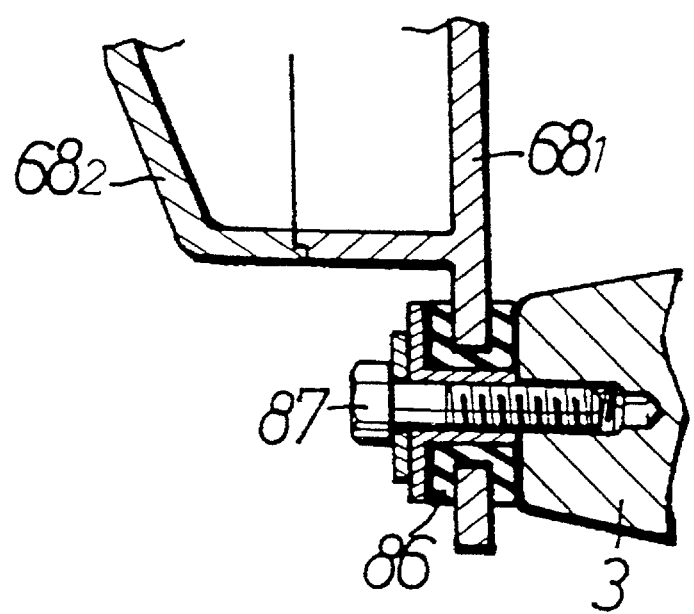
FIG. 4 is a sectional view taken along a line 4—4 in FIG. 3.

The structure of a gear shift ratio changing means 61 provided on the driving pulley 19 will be described below with further reference to FIGS. 4 and 5. The gear shift ratio changing means 61 is disposed in the form of a unit as an assembly within a containing chamber in the belt type continuously variable transmission B covered by the left case half 3 and the side cover 8.

The gear shift ratio changing means 61 includes a motor 62 disposed to extend perpendicular to the crankshaft 13 along an inner wall of the left case half 3. A worm gear $63_1$ formed at a tip end of an output shaft 63 of the motor 62 is meshed with a worm wheel 65 carried on a worm wheel shaft 64 disposed in parallel to the crankshaft 13. The worm wheel 65 is meshed with a helical gear $66_1$ formed on an outer periphery of a movable collar 66. A multi-thread screw $66_3$ is formed on an inner periphery of a shank $66_2$ of the movable collar 66 and meshed with a multi-thread screw $68_3$ formed on a cover member 68 for the gear shift ratio changing means 61, which is mounted to the left case half 3.

The cover member 68 is a doughnut-like hollow vessel formed by combination of a ring-like inner cover $68_1$ with an outer cover $68_2$. The worm gear $63_1$, the worm wheel 65 and the movable collar 66 are lubricated by a grease enclosed in the cover member 68. The cover member 68 is detachably supported in a floating manner in the left case half 3 through a pair of bolts 87 (FIG. 3) penetrating through a rubber bush 86 (FIG. 4) which is mounted on projections on an outer periphery of the inner cover $68_1$.

Since the gear shift ratio changing means 61 is disposed within the containing chamber in the belt type continuously variable transmission B covered by the left case half 3 and the side cover 8, an operational sound of the motor 62 is shut away within the containing chamber and deadened. In addition, since the grease is enclosed within the cover member 68, there is no fear of a leakage of the grease into the left case half 3, which may cause a slippage of the endless belt 22 of the belt type continuously variable transmission B. Further, since the gear shift ratio changing means 61 is assembled in the form of a unit and hence, not only the assembling to the transmission B and the maintenence thereof can be facilitated, but also a space between the left case half 3 and the side cover 8 for containing the belt type continuously variable transmission B can be efficiently utilized to make the entire transmission B compact. Moreover, since the gear shift ratio changing means 61 is supported on the left case half 3 through the rubber bushes 86 in a floating manner, any vibration cannot be transmitted to the gear shift ratio changing means 61 from the left case half 3 on one hand, and on the other hand, any vibration caused by the gear shift ratio changing means 61 cannot leak out.

A left end of the shank $66_2$ of the movable collar 66 is relatively rotatably but axially non-movably connected to the movable pulley half 21 through a ball bearing 69. Thus, if the motor 62 is driven in one direction, the movable collar 66 is rotated through the worm gear $63_1$ and the worm wheel 65, so that the multi-thread screw $66_3$ of the movable collar 66 is moved in a direction of an arrow A by a reaction force acting from the multi-thread screw $68_3$ of the cover member 68, and the movable pulley half 21 is moved toward the stationary pulley half 20, with the result that the width of a groove in the driving pulley 19 is reduced. On the other hand, if the motor 62 is driven in an opposite direction, the movable collar 66 is moved in a direction of an arrow B, with the result that the width of the groove in the driving pulley 19 is increased.

The gear shift ratio changing means 61 is provided with a limit switch mechanism 70 for detecting the left and right limits of the movement of the movable collar 66, i.e., a position in which the gear shift ratio is LOW and a position in which the gear shift ratio is TOP. The limit switch mechanism 70 comprises a first limit switch 71 for detecting the position in which the gear shift ratio position is LOW, and a second limit switch 72 for detecting the position in which the gear shift ratio is TOP. Each of the limit switches 71 and 72 is operated by opposite ends of an urging piece 74 mounted at one end of a reciprocally swingable shaft 73. To the swingable shaft 73 are secured along its axis a first leaf 75 for operating the first limit switch 71 and a second leaf 76 for operating the second limit switch 72. A predetermined angle difference is defined between both the leaves 75 and 76. A spring 77 is mounted on the second leaf 76 for biasing the second leaf 76 in a direction to abut against the movable collar 66, and a step $66_4$ is formed on the movable collar 66 at an end face adjacent the engine E.

Figure 6:
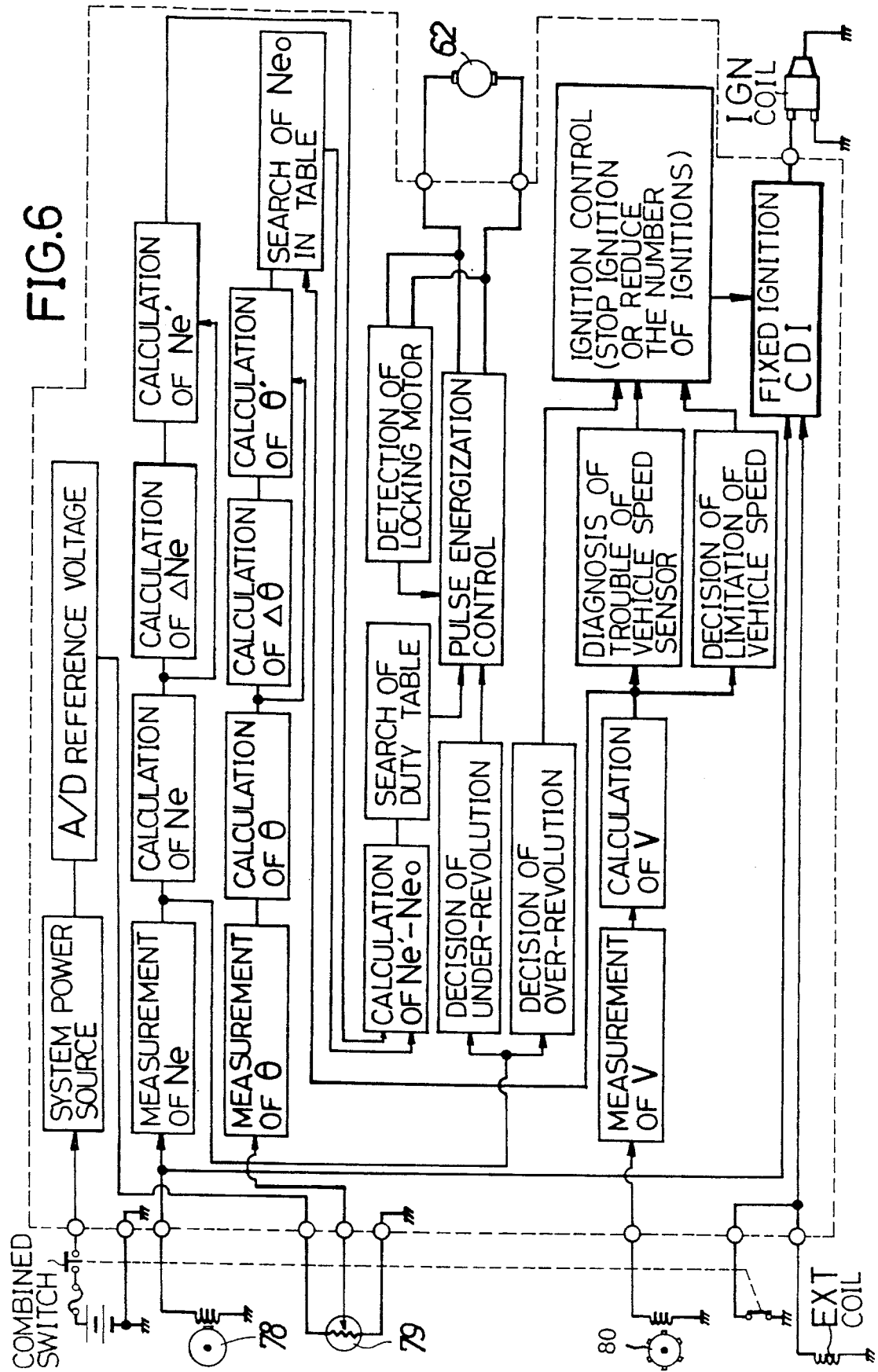
FIG. 6 is a block diagram of a control means.

FIG. 6 is a block diagram illustrating a control means for the motor 62 of the gear shift ratio changing means 61. The motor 62 is controlled by output signals from an engine rotational speed sensor 78 for detecting the rotational speed of the engine E from the rotation of the flywheel 14, an accelerator opening degree sensor 79 comprised of a potentiometer operatively connected to an opening and closing stem of a throttle valve, and a vehicle speed sensor 80 for detecting the vehicle speed from the rotation of the clutch outer 46.

More specifically, if an accelerator opening degree θ is calculated on the basis of the output signal from the accelerator opening degree sensor 79, a preestimated value θ' of accelerator opening degree is calculated on the basis of such accelerator opening degree θ and a variation rate Δθ of the opening degree θ. In addition, a vehicle speed V is detected on the basis of the output signal from the vehicle speed sensor 80, and a target engine rotational speed $Ne_o$ is searched in a table on the basis of such vehicle speed V and the preestimated value θ' of accelerator opening degree.

If an engine revolution number Ne is calculated on the basis of the output signal from the engine rotational speed sensor 78, a preestimated value Ne' of engine rotational speed is calculated on the basis of such engine rotational speed Ne and a variation rate Δ Ne of the engine rotational speed Ne. The preestimated value Ne' of engine rotational speed and the target engine rotational speed $Ne_o$ searched in the table are compared with each other, and a difference therebetween, i.e., a deviation of the preestimated value Ne' from the target engine rotational speed $Ne_o$ is calculated. Subsequently, a duty table is searched on the basis of such deviation, and a pulse signal indicative of a command to drive the motor 62 is controlled to change the gear shift ratio by the gear shift ratio changing means 61, thereby causing an actual engine rotational speed to coincide with the target engine rotational speed $Ne_o$.

If an over-revolution of the engine is determined on the basis of the output signal from the engine rotational speed sensor 78, or if it is determined on the basis of the output signal from the vehicle speed sensor 80 that the vehicle speed has exceeded a limit vehicle speed, the output power from the engine E is reduced by stopping the ignition of a spark plug or increasing the interval of ignition thereof.

The operation of the first embodiment of the present invention having the above-described construction will be described below.

When the engine E is in an idling state, the grooves in the driving pulley 19 and the driven pulley 35 have increased and reduced widths, respectively, and the gear shift ratio is LOW. If the rotational speed of the engine is now increased, the rotation of the crankshaft 13 is transmitted from the driving pulley 19 through the endless belt 22 to the driven pulley 35 to rotate the clutch inner 40 of the automatic centrifugal clutch 43 along with the driven pulley 35. This causes the friction member 45 of the clutch weight 44 mounted on the clutch inner 40 to abut against the clutch outer 46, thereby permitting the output shaft 32 to be driven.

The rotation of the output shaft 32 is transmitted through the gear reducer G to the rear wheel Wr.

Here, if the vehicle is started to travel by the engagement of the automatic centrifugal clutch 43, the motor 62 of the gear shift ratio changing means 61 is driven in accordance with the current accelerator opening degree, vehicle speed and engine rotational speed, and the worm wheel 65 meshed with the worm gear $63_1$ formed on the output shaft 63 of the motor 62 is rotated. When the rotation of the worm wheel 65 is transmitted through the helical gear $66_1$ to the movable collar 66, the latter is moved in the direction A in FIG. 1 by the action of multi-thread screws $66_3$ and $68_3$. This causes the movable pulley half 21 of the driving pulley 19 to move toward the stationary pulley half 20 to reduce the width of the groove, so that the endless belt 22 engaging the driving pulley 19 is moved radially outwardly. As a result, the width of the groove in the driven pulley 35 is increased by the tension of the endless belt 22, and the movable pulley half 34 is moved away from the stationary pulley half 33 against a resilient force of the spring 41. Thus, the effective radius of the driving pulley 19 is increased, while the effective radius of the driven pulley 35 is decreased, and the gear shift ratio of the belt type continuously variable transmission B is changed from LOW toward TOP.

The position in which the gear shift ratio of the belt type continuously variable transmission B is LOW or TOP is detected by the limit switch mechanism 70. More specifically, if the movable collar 66 is rotated in a direction of an arrow a shown in FIG. 5A, and the movable pulley half 21 of the driving pulley 19 reaches a LOW position spaced apart farthest from the stationary pulley half 20, the first leaf 75 is urged upwardly in a direction of the arrow at the end of the first leaf 75 against the resilient force of the spring 77 by means of the step $66_4$ formed on the collar 66, and the swingable shaft 73 is swung in a direction of an arrow b. As a result, the first limit switch 71 is operated by the urging piece 74 and detects the fact that the gear shift ratio is LOW. On the other hand, if the movable collar 66 is rotated in a direction of an arrow c shown in FIG. 5B, so that the movable pulley half 21 of the driving pulley 19 is moved toward a TOP position closest to the stationary pulley half 20, both the first leaf 75 and the second leaf 76 are spaced apart from the helical gear $66_1$, and the swingable shaft 73 is swung in a direction of an arrow d shown in FIG. 5B by the resilient force of the spring 77. As a result, the limit switch 72 is operated and detects the fact that the gear shift ratio is TOP. It should be noted that when the gear shift ratio is changed from TOP the toward the LOW, the second leaf 76 having been spaced apart from the movable collar 66 is urged by the step $66_4$ of the movable collar 66 and swings in the direction of the arrow b so as to locate over an outer peripheral surface of the helical gear $66_1$. This provides a condition in which the first leaf 75 can be urged upwardly by the step $66_4$ when the gear shift ratio reaches the LOW.

Figure 7:
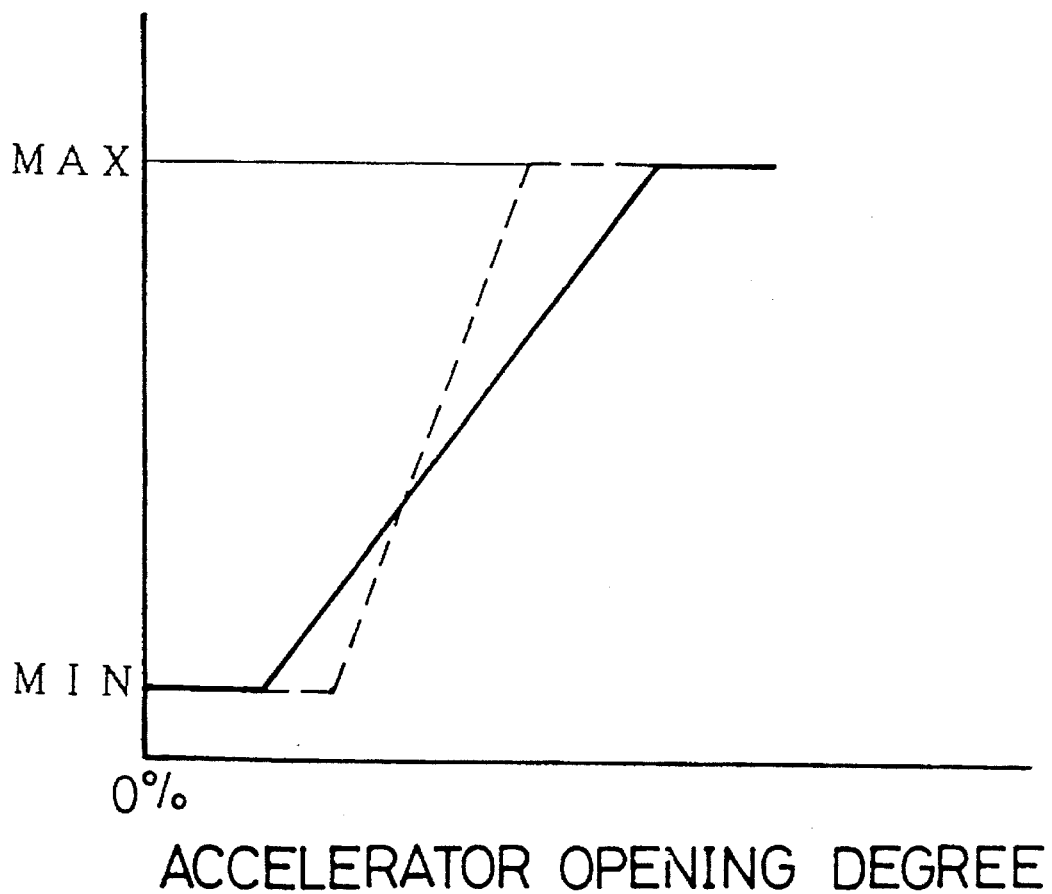
FIG. 7 is a graph illustrating a characteristic of a potentiometer.
Figure 8:
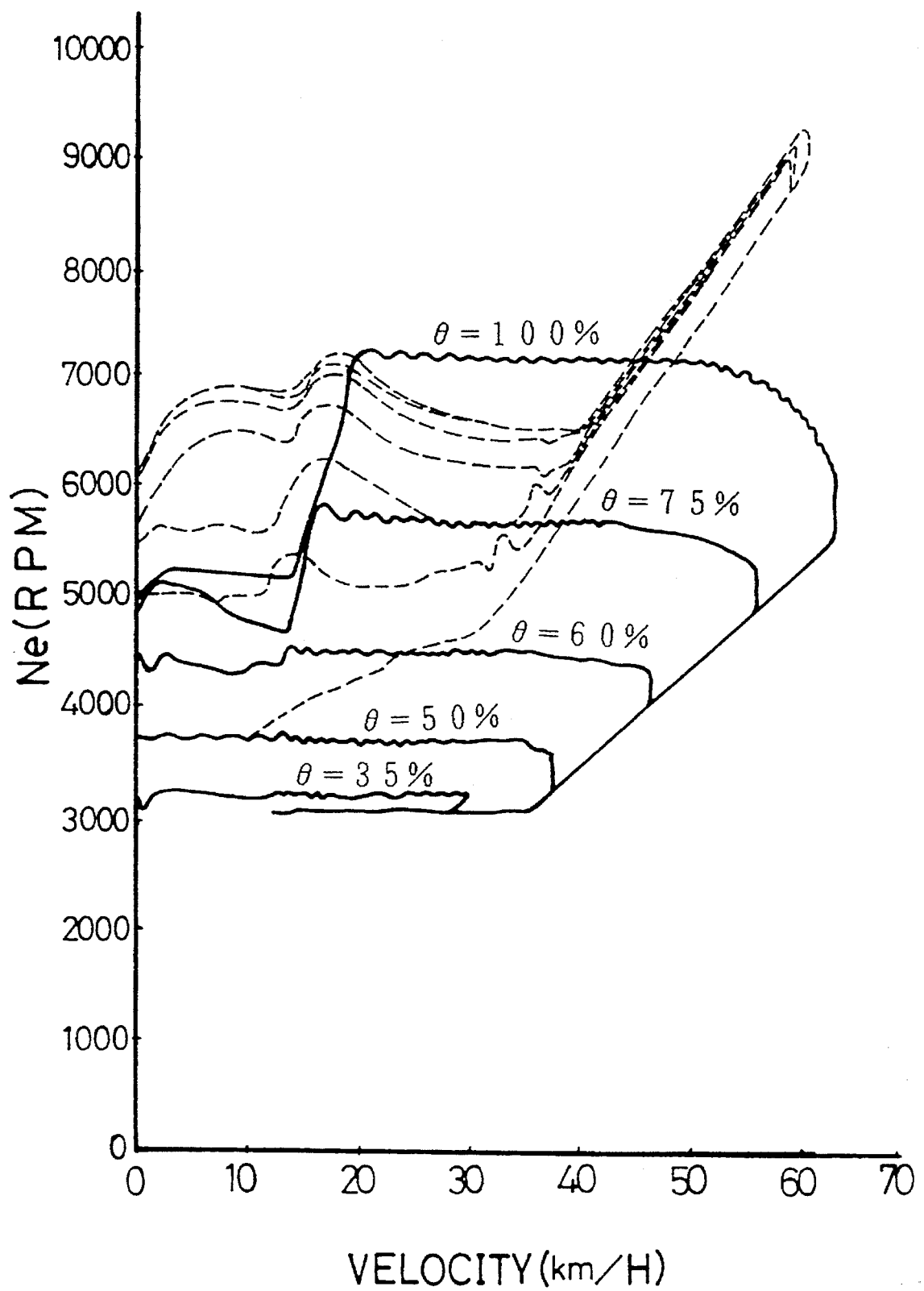
FIG. 8 is a graph illustrating shifting characteristics of the belt type continuously variable transmission.
Figure 9:
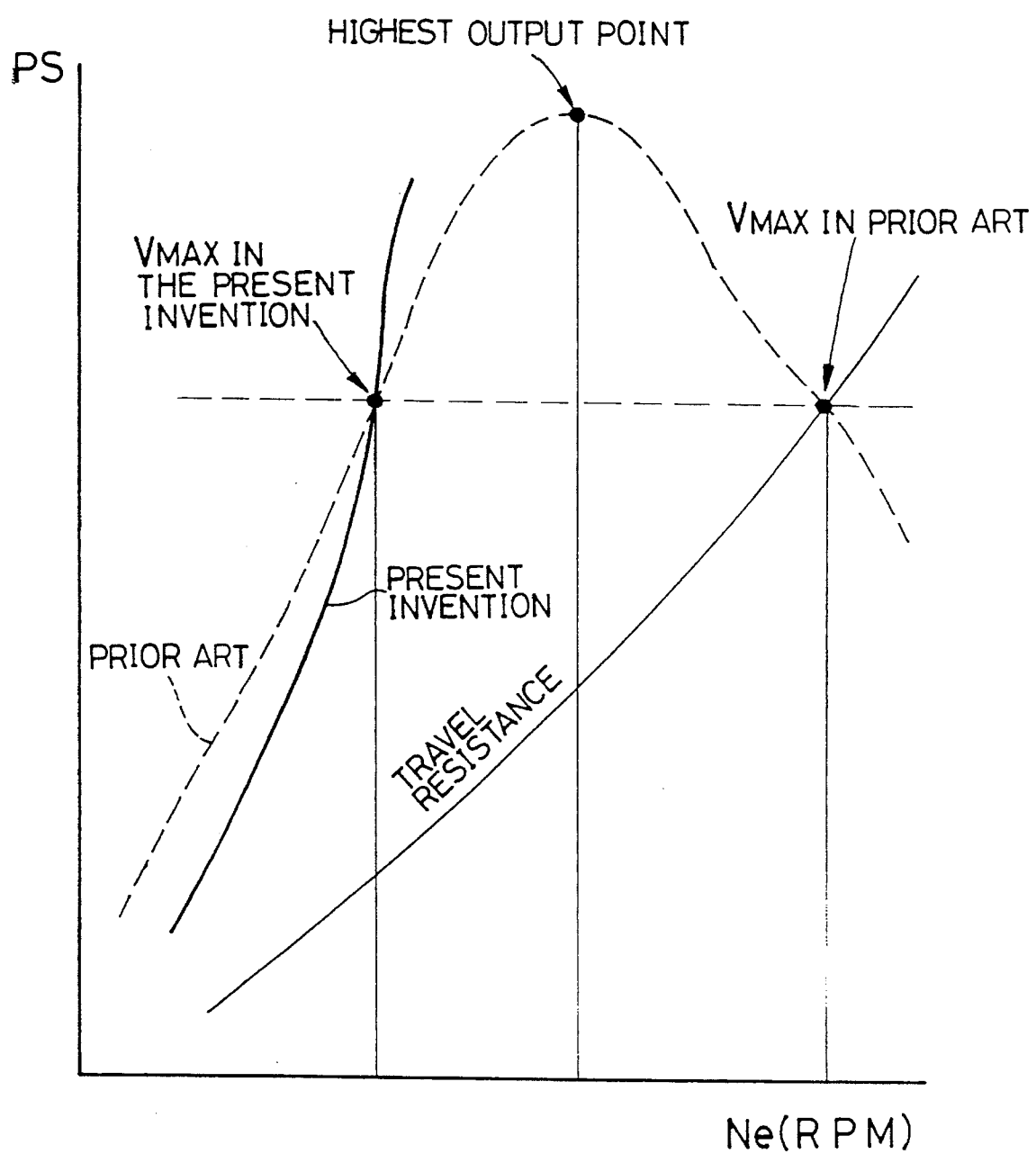
FIG. 9 is a graph illustrating a set point of the highest speed.

If the output characteristic of the potentiometer 83 relative to the accelerator opening degree is established as shown by a solid line in FIG. 7, the shifting characteristics of the belt type continuously variable transmission B corresponding to various accelerator opening degrees θ are indicated as shown in FIG. 8. The shifting characteristics of the belt type continuously variable transmission B according to the present invention are such that the engine rotational speed during cruising, i.e., in the position in which the gear shift ratio is TOP is remarkably reduced, as compared with those (shown by broken lines) of the prior art mechanical transmission. This enables a reduction in cruising noise. In addition, it is possible to suppress the engine rotational speed to a low level at a low vehicle speed, thereby reducing the consumption of fuel. If the output characteristic of the potentiometer 83 is established as shown by a broken line in FIG. 7, it is possible to provide a further reduction in consumption of fuel at a low vehicle speed and a stabilization of the highest speed.

For limiting the highest or maximum speed of a motorcycle, it is a conventional practice to set the highest speed by balancing the engine output with the travel resistance when the gear shift ratio becomes TOP, or by balancing the engine output power with the travel resistance by reducing the engine output power by means of an ignition time control or a fuel injection amount control. However, such prior art technique is conducted by controlling in a condition where the gear shift ratio is fixed at TOP, and therefore there is a disadvantage that the highest speed is rendered unstable or reduced due to factors such as a dispersion in gear shift ratio, a variation in gear shift ratio due to a wear, or a dispersion in engine output power. Moreover, it is necessary, in the prior art technique, to set the balanced point at a location past the highest engine output point and for this reason, there is a limitation in the establishment of the engine output characteristic, requiring a large labor to stabilize the highest speed. According to the present invention, however, it is possible to set the highest speed at a location short of the highest engine output point, thereby insuring a large range of variation in output near the highest speed to maintain a stabilized highest speed. Moreover, the engine rotational speed at the highest output point is reduced, making it possible to substantially reduce the consumption of fuel.

Figure 10A:
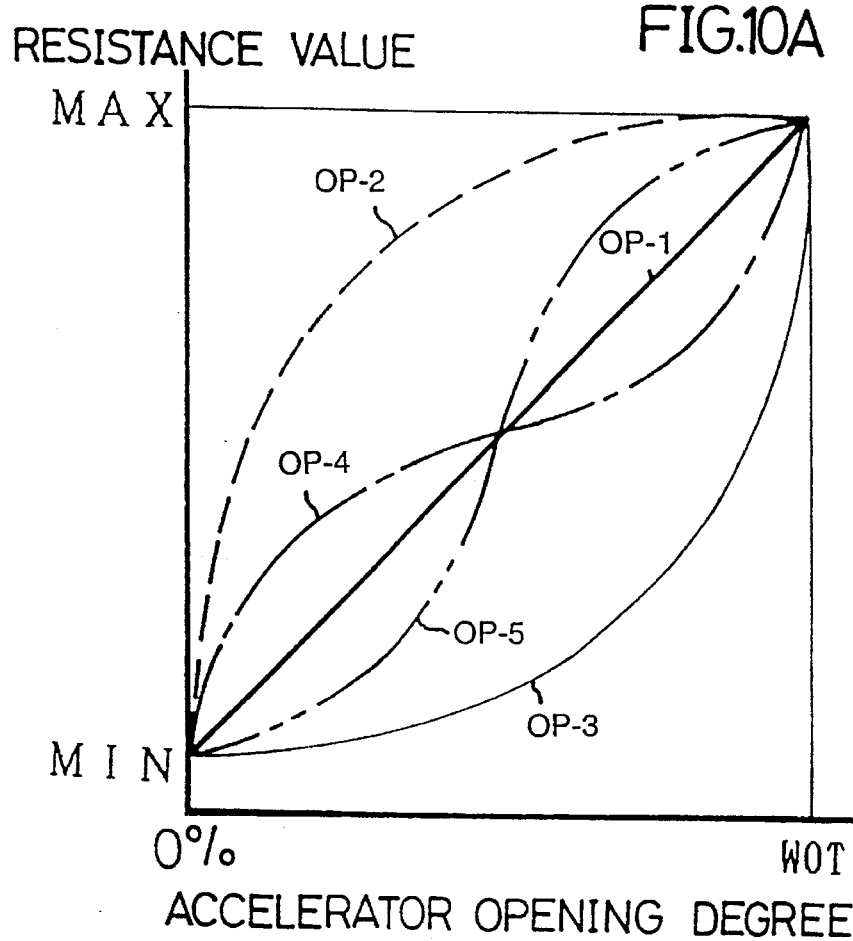
FIG. 10 is graphs illustrating variations of the characteristic of the potentiometer and variations of the shifting characteristic of the belt type continuously variable transmission.
Figure 10B:
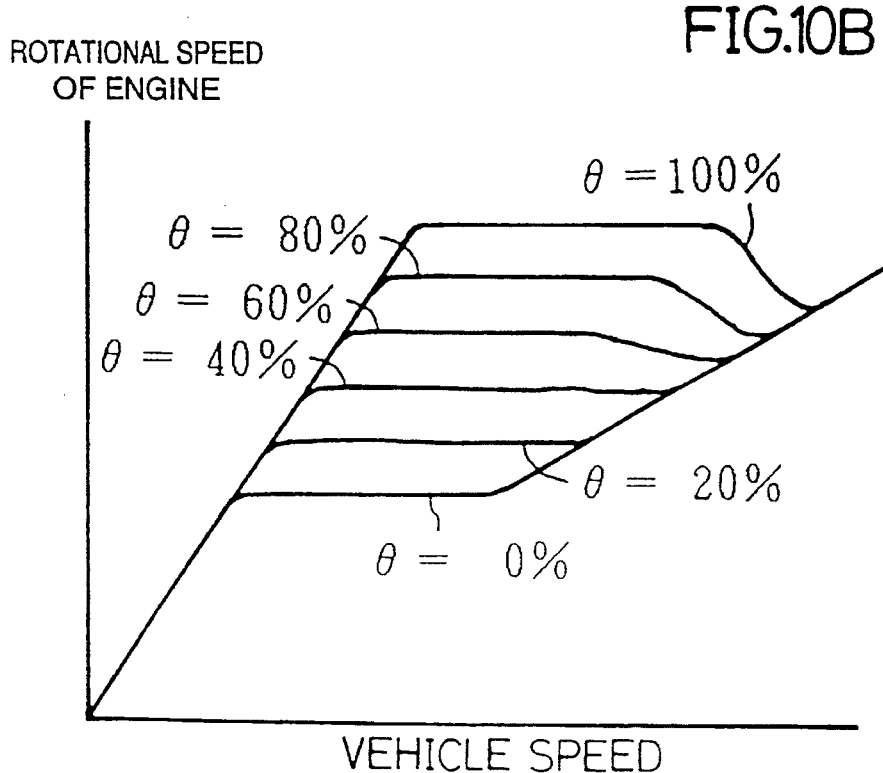
Figure 10C:
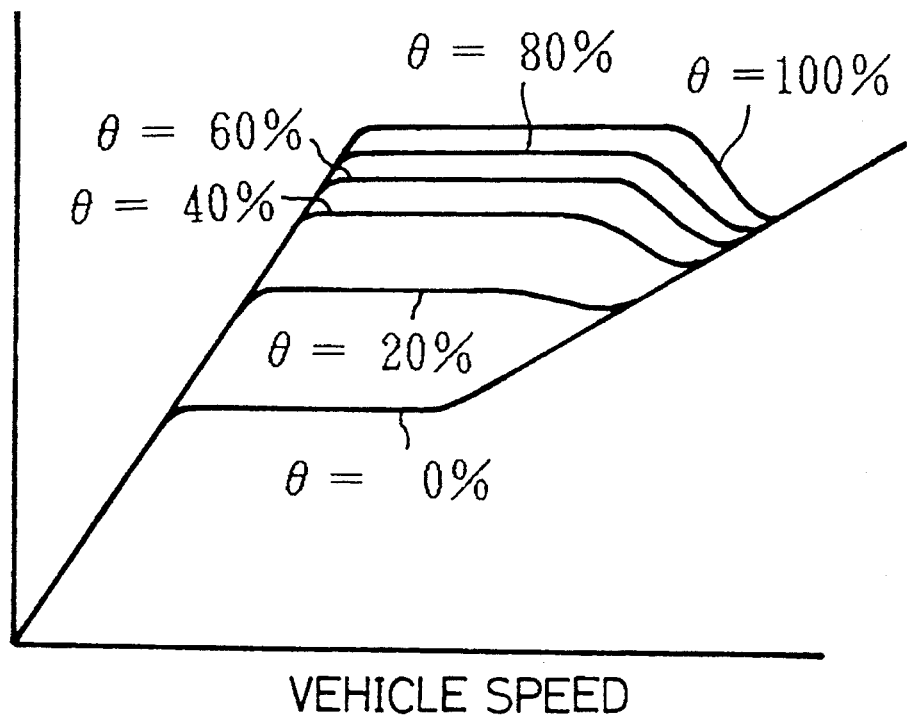
Figure 10D:
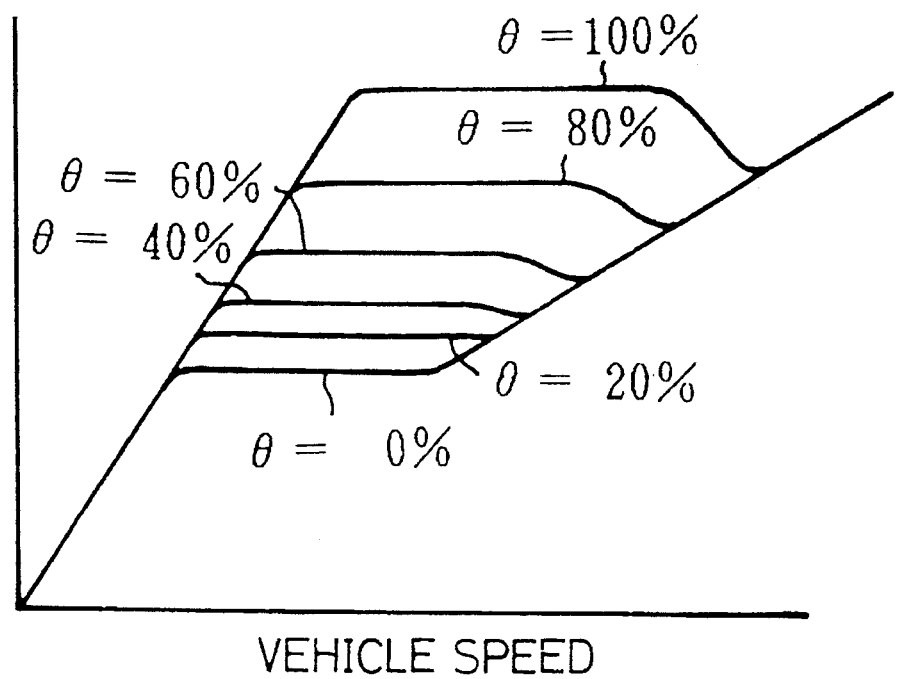
Figure 10E:
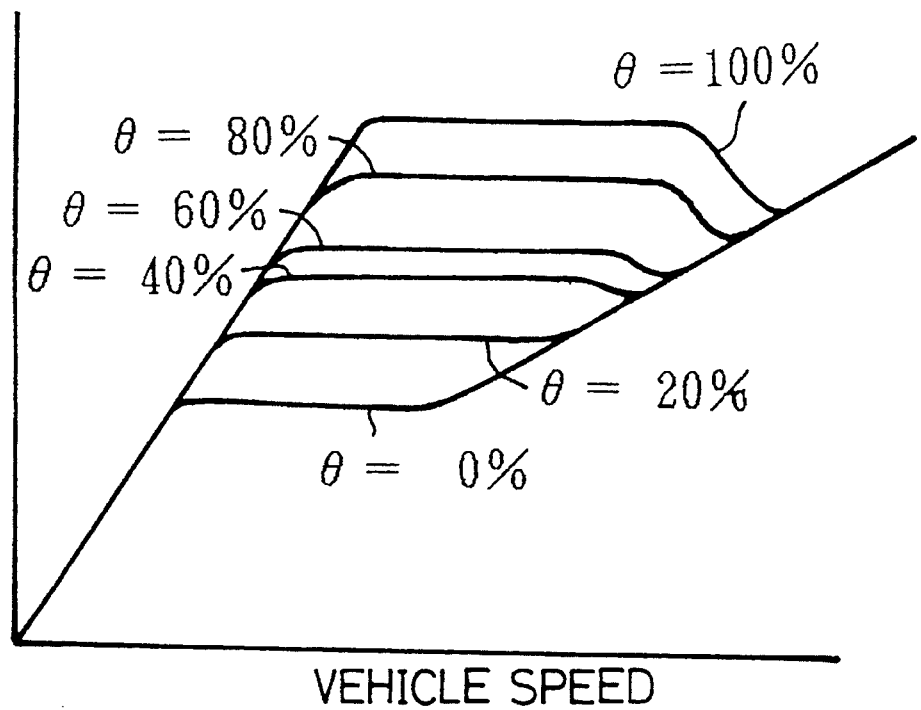
Figure 10F:
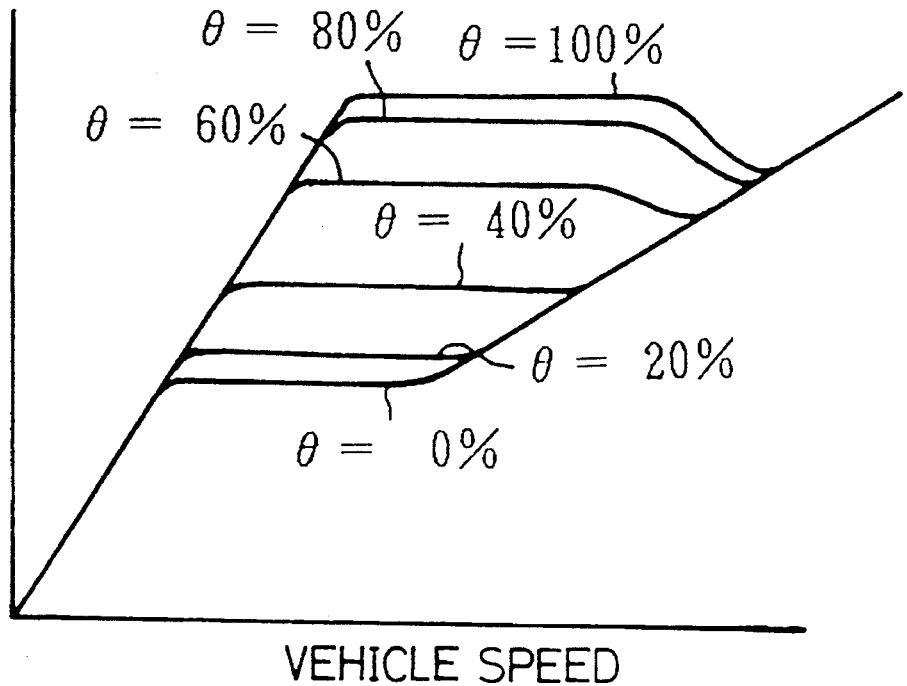

If the output characteristic of the potentiometer 83 relative to the accelerator opening degree has variations as shown by OP-1 to OP-5 in FIG. 10A, various shifting characteristics shown in FIGS. 10B to 10F can be provided to the belt type continuously variable transmission B. That is, if the output characteristic of the potentiometer 83 is established in a linear pattern as shown by OP-1, the interval between the levels of engine rotational speed corresponding to the individual accelerator opening degrees at which gear shifts are conducted is uniform, but if the output characteristic of the potentiometer 83 is established in any of non-linear patterns as shown by OP-2 to OP-5, the interval between the levels of the engine rotational speed can be varied as an upward narrowed pattern, a downward narrowed pattern, a halfway narrowed pattern and an upward and downward narrowed pattern. This enables various variations to be provided to the performance such as specific fuel consumption and travel feeling in a simple structure. If any of these shifting characteristics can arbitrarily be selected by shifting of a switch, a travelling applicable to the usage of the vehicle can be realized. It is desirable that the switch for changing over the shifting characteristics is mounted in the vicinity of an accelerator or a steering handle.

Figure 11:
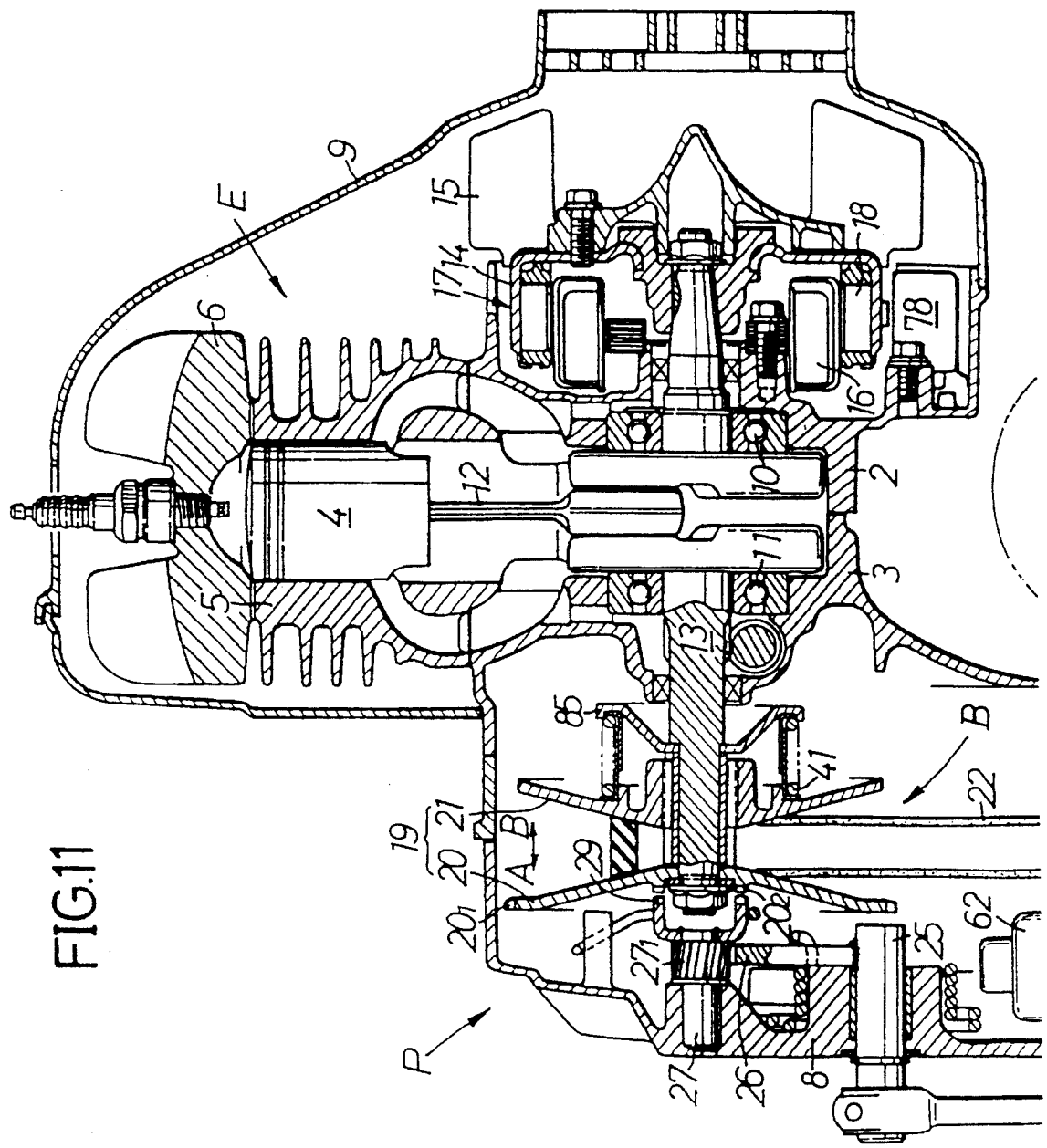
FIG. 11 is a first portion of a plan view of the entire belt type continuously variable transmission according to the second embodiment.
Figure 12:
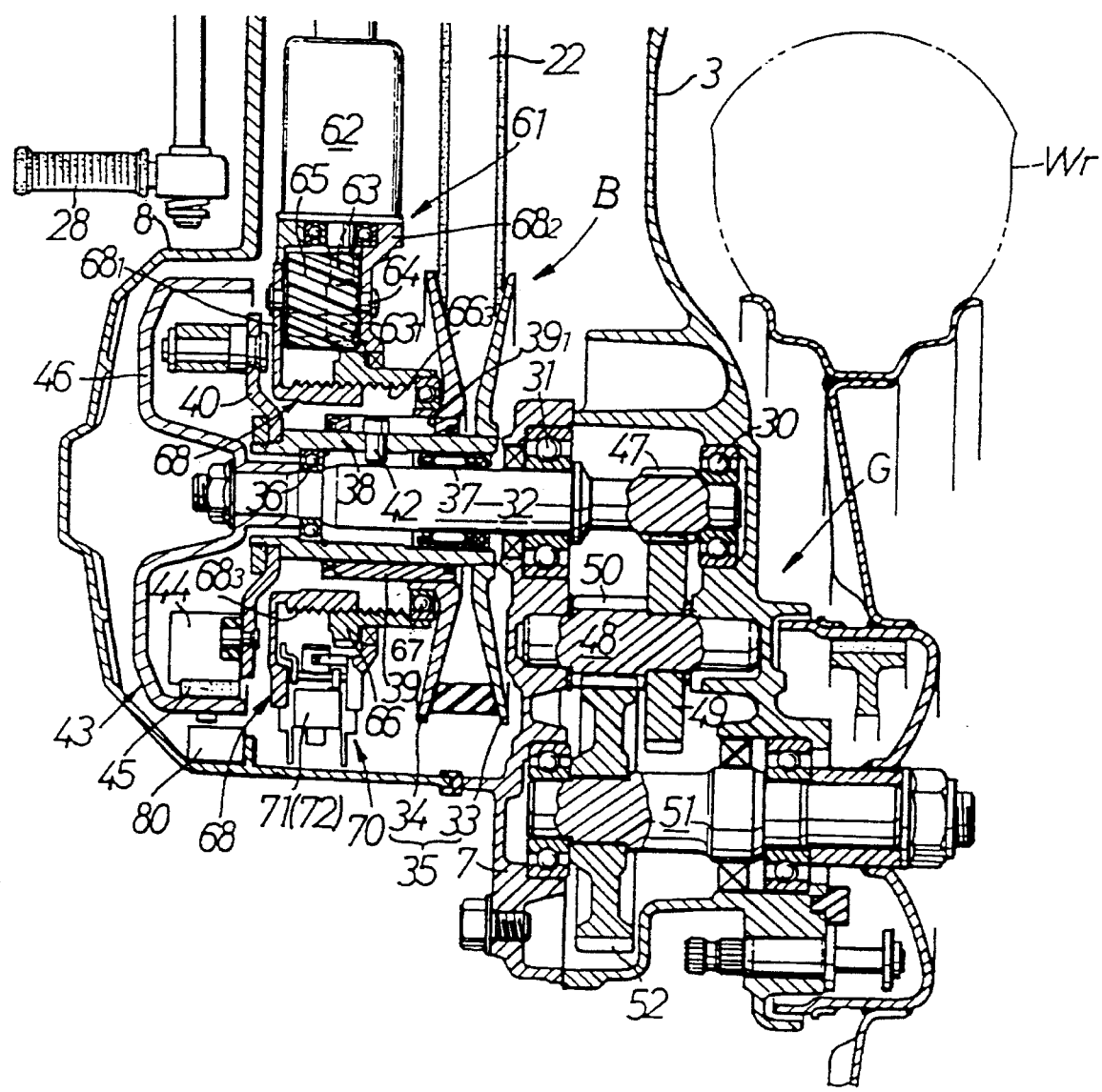
FIG. 12 is a second portion of the plan view.
Figure 13:
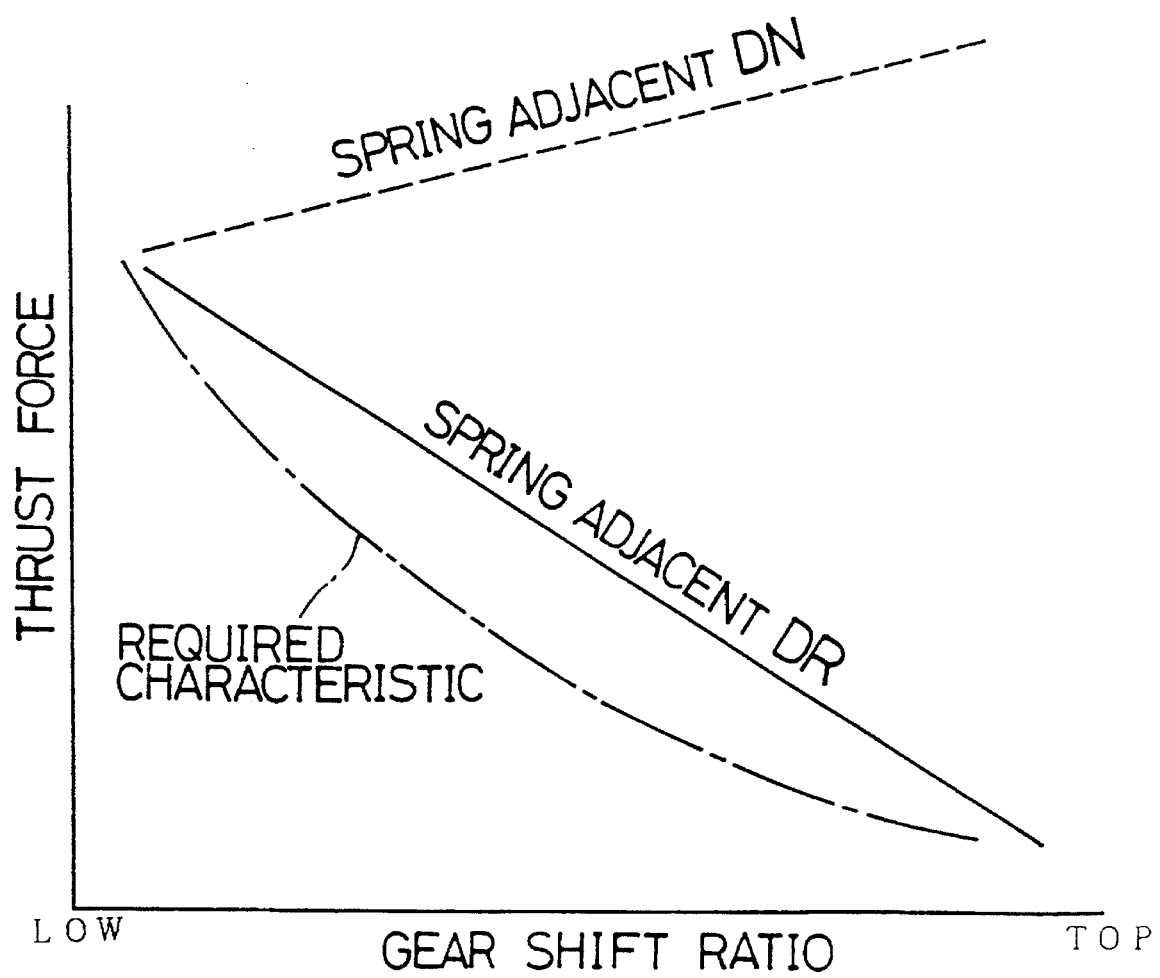
FIG. 13 is a graph illustrating a relationship between the gear shift ratio and the thrust force of a movable pulley half.

FIGS. 11 to 13 illustrate a second embodiment of the present invention, wherein components corresponding to those in the previous first embodiment are designated by like reference characters.

As shown in FIGS. 11 and 12, the second embodiment has a feature that a gear shift ratio changing means 61 is provided for the driven pulley 35. More specifically, the cover member 68 mounted around the outer periphery of the output shaft 32 is provided with a worm gear 63$_1$ rotated by the motor 62, a worm wheel 65 meshed with the worm gear 63$_1$, and a movable collar 66 meshed with the worm wheel 65 for axial movement. The movable collar 66 is relatively rotatably but axially non-movably connected to the movable pulley half 34 of the driven pulley 35 through a ball bearing 67. This ensures that if the motor 62 is driven on the basis of the accelerator opening degree, the engine rotational speed and the vehicle speed as in the previous embodiment, the movable pulley half 34 is moved toward and away from the stationary pulley half 33, so that the width of the groove in the driven pulley 35 is controlled.

The driving pulley 19, which causes the width of its groove to change in response to the operation of the driven pulley 35, includes a spring 41 mounted in a compressed manner between a spring seat 85 provided on the crankshaft 13 and the movable pulley half 21. The spring 41 acts on the movable pulley half 21 in a direction toward the stationary pulley half 20. The urging force of the spring 41 is larger when the width of the groove is increased (when the gear shift ratio is LOW), and the urging force is smaller when the width of the groove is decreased (when the gear shift ratio is TOP).

It is known that the thrust force of the movable pulley half sufficient for the endless belt 22 not to slip is proportional to the magnitude of the torque transmitted and is inversely proportional to the effective radius of the pulley. In other words, as shown by a dashed line in FIG. 13, the magnitude of the sufficient thrust force has a characteristic that it gradually decreases as the width of the groove in a pulley gets smaller. In the driven pulley 35 in the belt-type continuously variable transmission B for a vehicle, the width of the groove is enlarged as the gear shift ratio is changed toward TOP. Accordingly, with the construction having the spring 41 provided for the driven pulley 35, there is a disadvantage that the thrust force is excessively exhibited as the gear shift ratio is changed toward TOP, as shown by a broken line in FIG. 13. However, if the spring 41 is provided for the driving pulley 19 as in this embodiment, it is possible to provide a variation in thrust force approaching a required characteristic shown by the dashed line in FIG. 13, ensuring that an optimal tension can be always applied to the endless belt 22 to prevent any slippage of the endless belt 22. Consequently, the motor 62 of the gear shift ratio changing means 61 is prevented from suffering from an excessive load, thereby enabling a more precise control of the gear shift ratio. In addition, since the endless belt 22 cannot necessarily suffer from an excessive thrust force, the endurance of the belt 22 can be improved and the reduction in thickness thereof can be realized.

Alternatively, a spring permitting a displacement changed in a non-linear pattern relative to the load may be used in place of the above-described spring 41.

FIGS. 14 to 17 illustrate a third embodiment of the present invention, wherein components corresponding to those in the previously-described first embodiment are designated by like reference characters.

Figure 14:
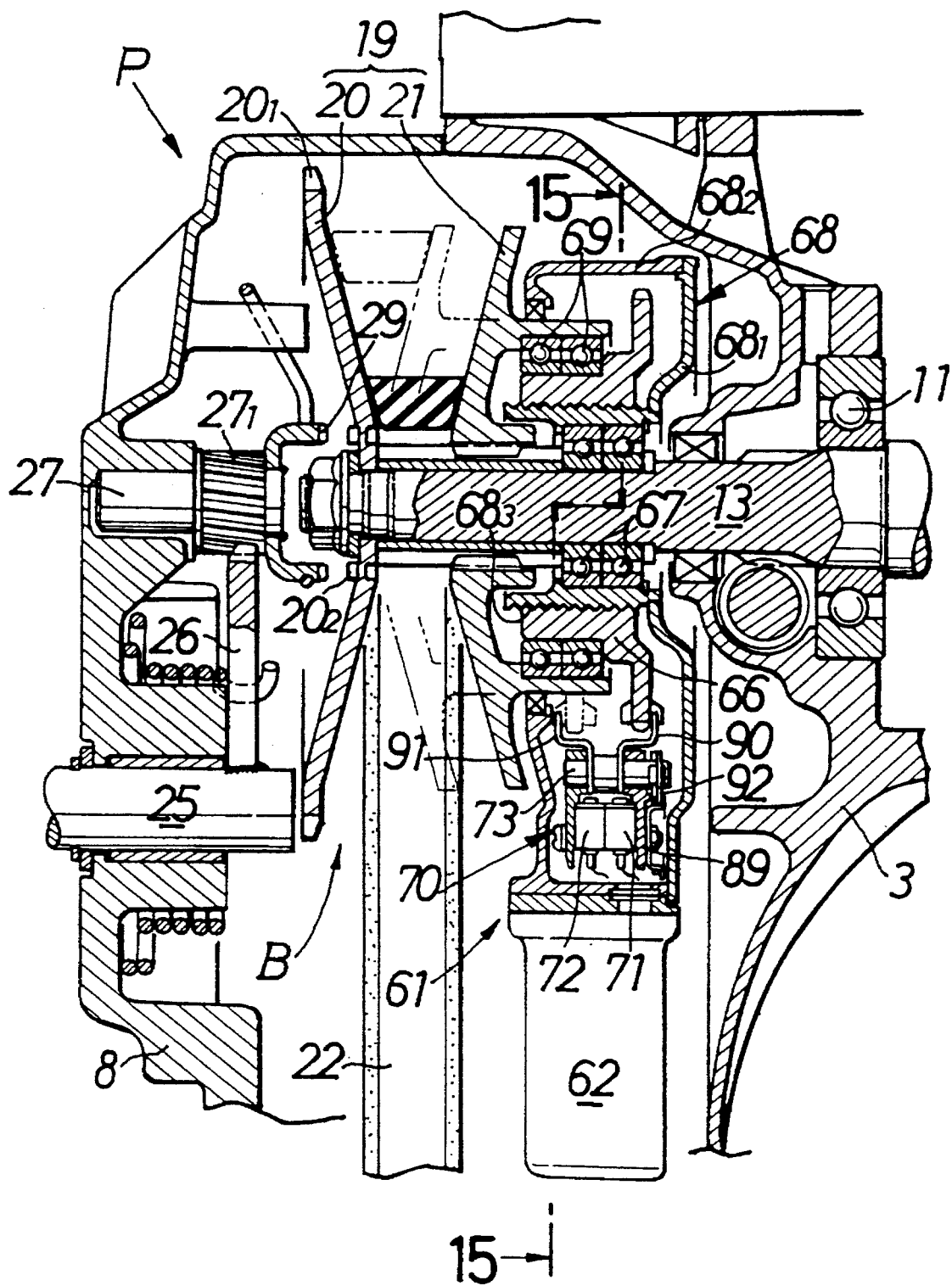
FIG. 14 is an enlarged view of an essential portion of a belt type continuously variable transmission according to the third embodiment.

As can be seen from FIG. 14, two ball bearings 67 are disposed side by side on the crankshaft 13 for supporting the multi-thread screw 68$_3$ of the cover member 68, and two ball bearings 69 are likewise disposed side by side for relatively rotatably connecting the movable pulley half 21 of the driving pulley 19 with the movable collar 66 threadedly engaged with the multi-thread screw 68$_3$ of the cover member 68. This ensures that the cover member 68 and the movable collar 66 rotatably disposed around the outer periphery of the crankshaft 13 can be supported in a stabilized manner not to incline relative to the crankshaft 13, thereby making it possible to further smoothly actuate the gear shift ratio changing means 61.

Figure 15:
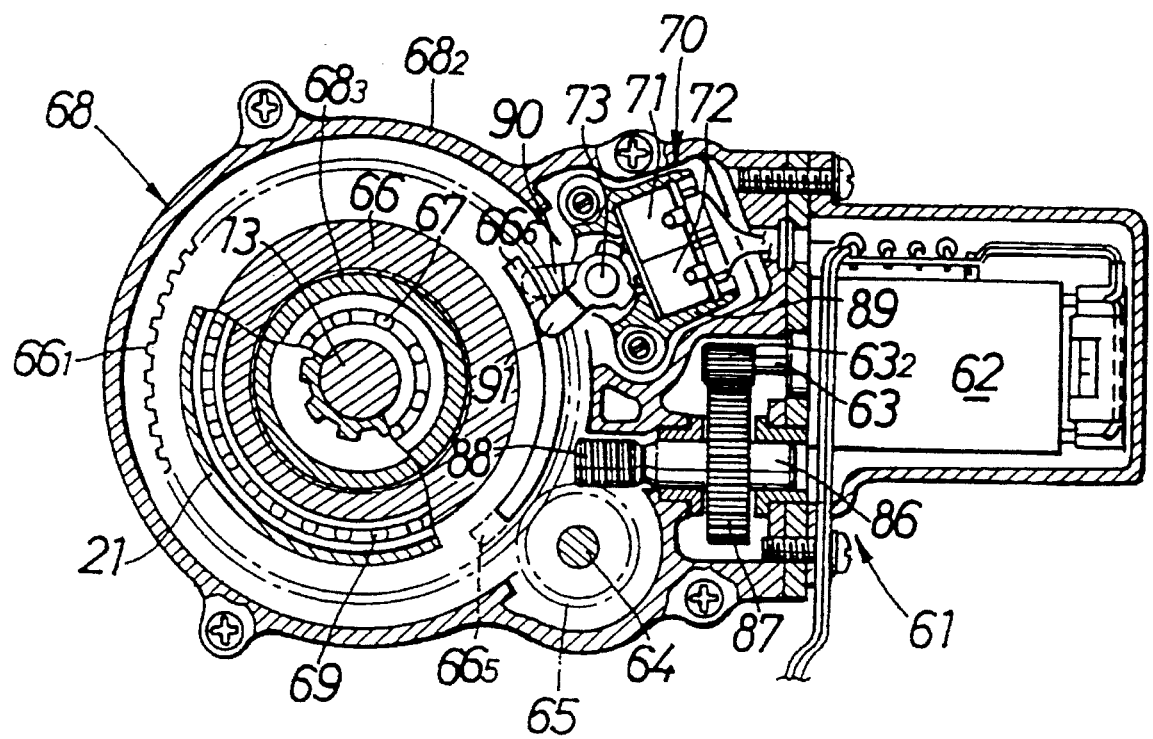
FIG. 15 is a sectional view taken along a line 15—15 in FIG. 14.

As can be seen from FIG. 15, an intermediate shaft 86 is interposed between the output shaft 63 of the motor 62 of the gear shift ratio changing means 61 and the worm wheel shaft 64 carrying the worm wheel 65. An intermediate gear 87 and a worm gear 88 provided on the intermediate shaft 86 are meshed with a pinion $63_2$ provided on the output shaft 63 of the motor 62 and the worm wheel 65, respectively. As a result of disposition of the intermediate shaft 86 in a system for transmitting a power from the motor 62 to the worm wheel 65 in this manner, a space for accommodating a limit switch mechanism 70 which will be described hereinafter is insured.

In the third embodiment, a limit switch mechanism 70 having a structure different from that in the previous first embodiment is employed.

Figure 16A:
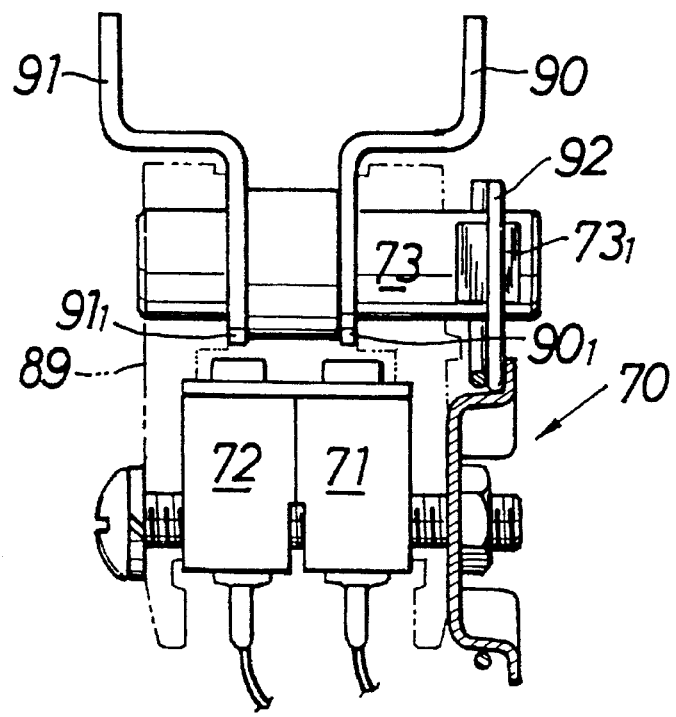
FIG. 16 is enlarged views of a limit switch mechanism.
Figure 16B:
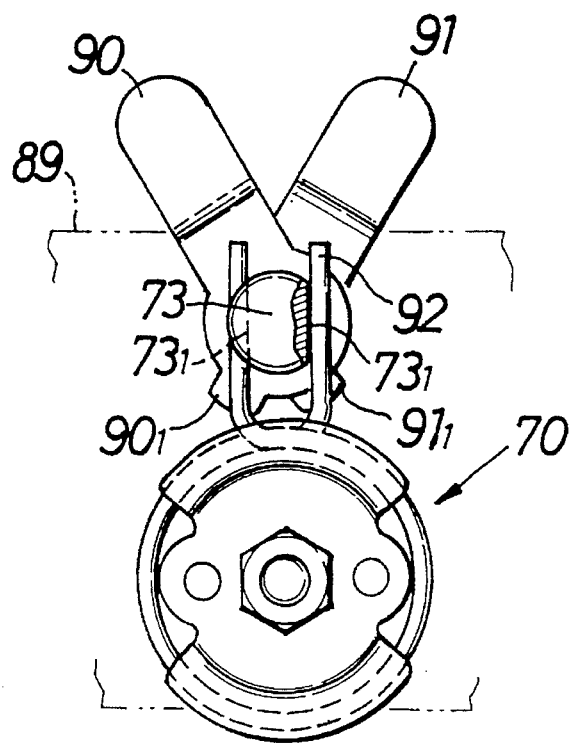

As can be seen from FIGS. 14 to 16, the limit switch mechanism 70 for detecting the left and right limit of the movement of the movable collar 66, i.e., a position in which the gear shift ratio is LOW and a position in which the gear shift ratio is TOP, comprises a first limit switch 71 for detecting such LOW position and a second limit switch 72 for detecting such TOP position. Two detecting pieces 90 and 91 having projections $90_1$ and $90_2$ for operating the limit switches 71 and 72 respectively are secured to a swingable shaft 73 which is rotatably supported on a switch housing 89 supporting the first and second limit switches 71 and 72. The detecting pieces 90 and 91 define an angle of 60° relative to each other. A spring 92 is supported at its central portion on the switch housing 89 and abuts at its opposite ends against arcuate notches $73_1$ formed at one end of the swingable shaft 73, thereby biasing the swingable shaft 73 and the two detecting pieces 90 and 91 toward their neutral positions shown in FIG. 14. On the other hand, arcuate projections $66_5$ and $66_6$ are provided on opposite sides of the movable collar 66, respectively and are capable of abutting against the pair of detecting pieces 90 and 91.

Figure 17A:
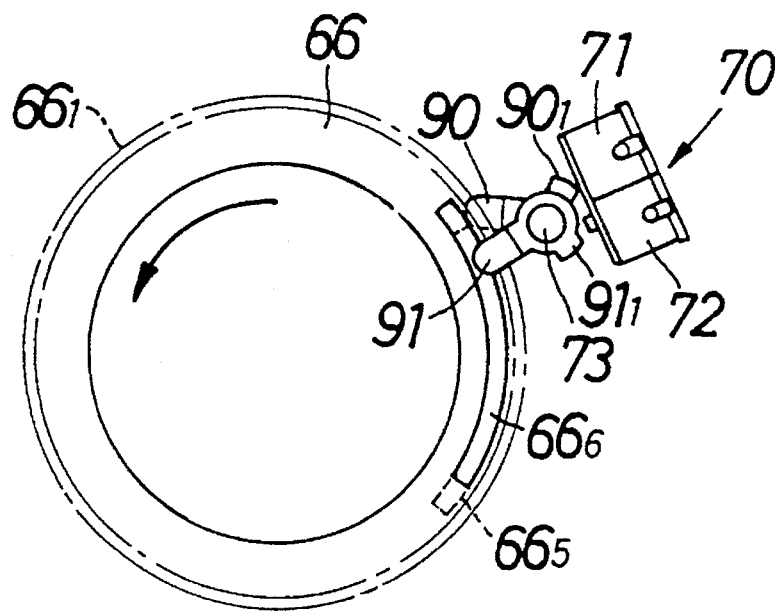
FIG. 17 is views for explaining the operation.
Figure 17B:
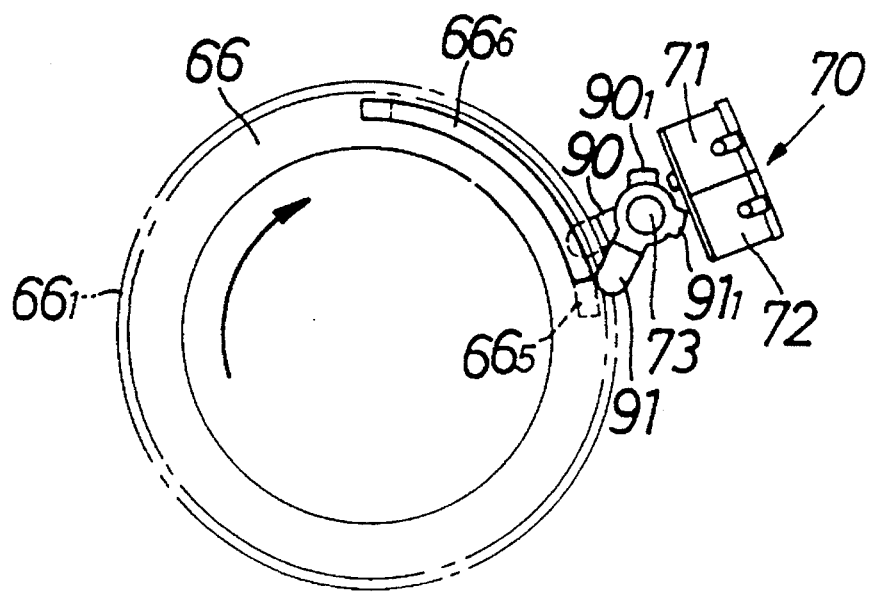

Thus, if the movable collar 66 is rotated by the motor 62 to a position shown by a solid line in FIG. 14 so as to change the gear shift ratio toward LOW, the projection $66_5$ formed on one of the sides of the movable collar 66 abuts against corresponding one of the detecting pieces 90, thereby swinging the one detecting piece 90 along with the swingable shaft 73 to a position shown in FIG. 17A. As a result, the first limit switch 71 is operated by the projection $90_1$ of the detecting piece 90 and detects the fact that the gear shift ratio has reached LOW. If the movable collar 66 is rotated to a position shown by a dashed line in FIG. 14 in order to change the gear shift ratio toward TOP, the projection $66_6$ formed on the other side of the movable collar 66 abuts against the other detecting piece 91, thereby swinging the detecting piece 91 along with the swingable shaft 73 to a position shown in FIG. 17B. Then, the second limit switch 72 is operated by the projection $91_1$ of the detecting piece 91 and detects the fact that the gear shift ratio has reached TOP.

Figure 18:
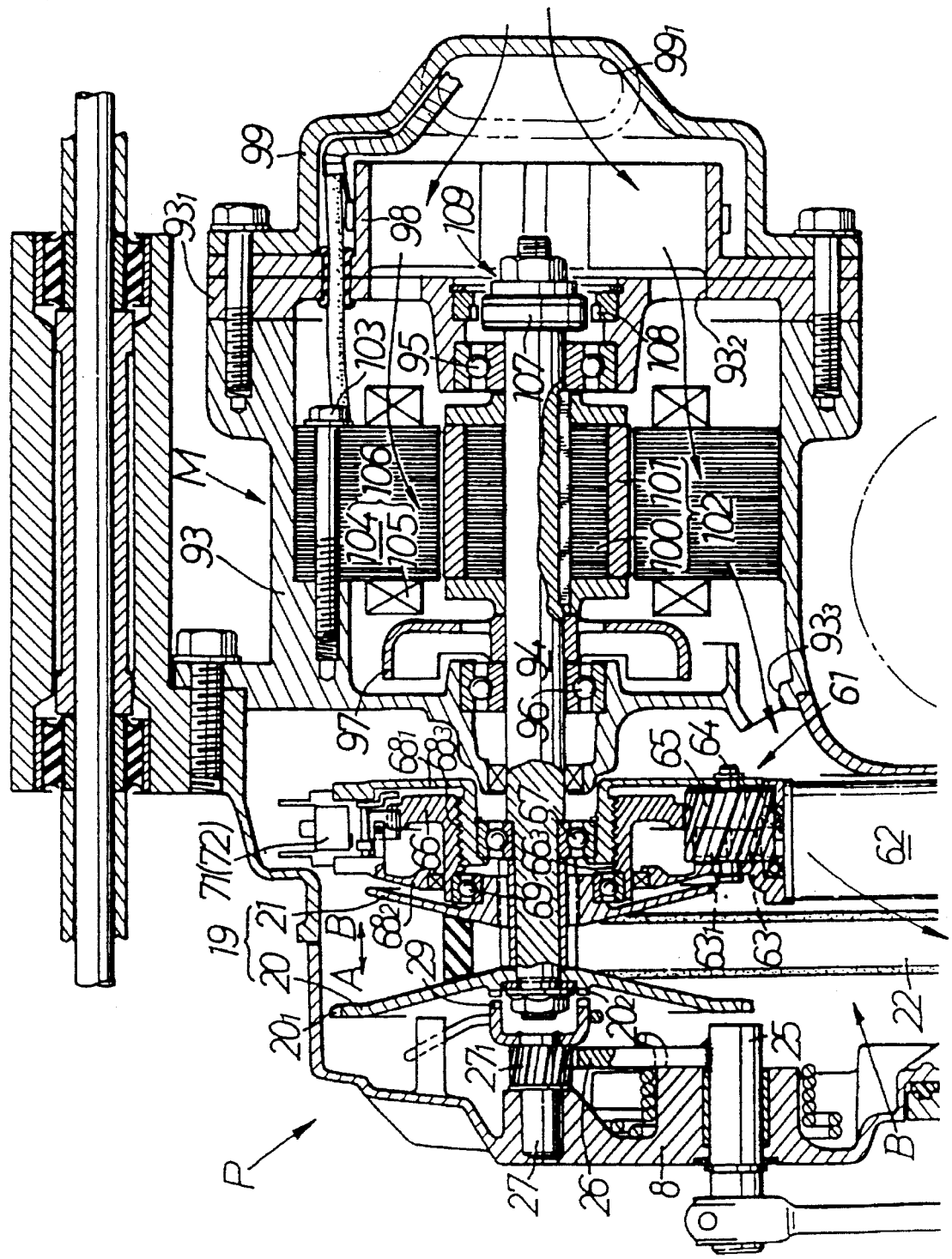
FIG. 18 is a first portion of a plan view of the entire belt type continuously variable transmission according to the fourth embodiment.
Figure 19:
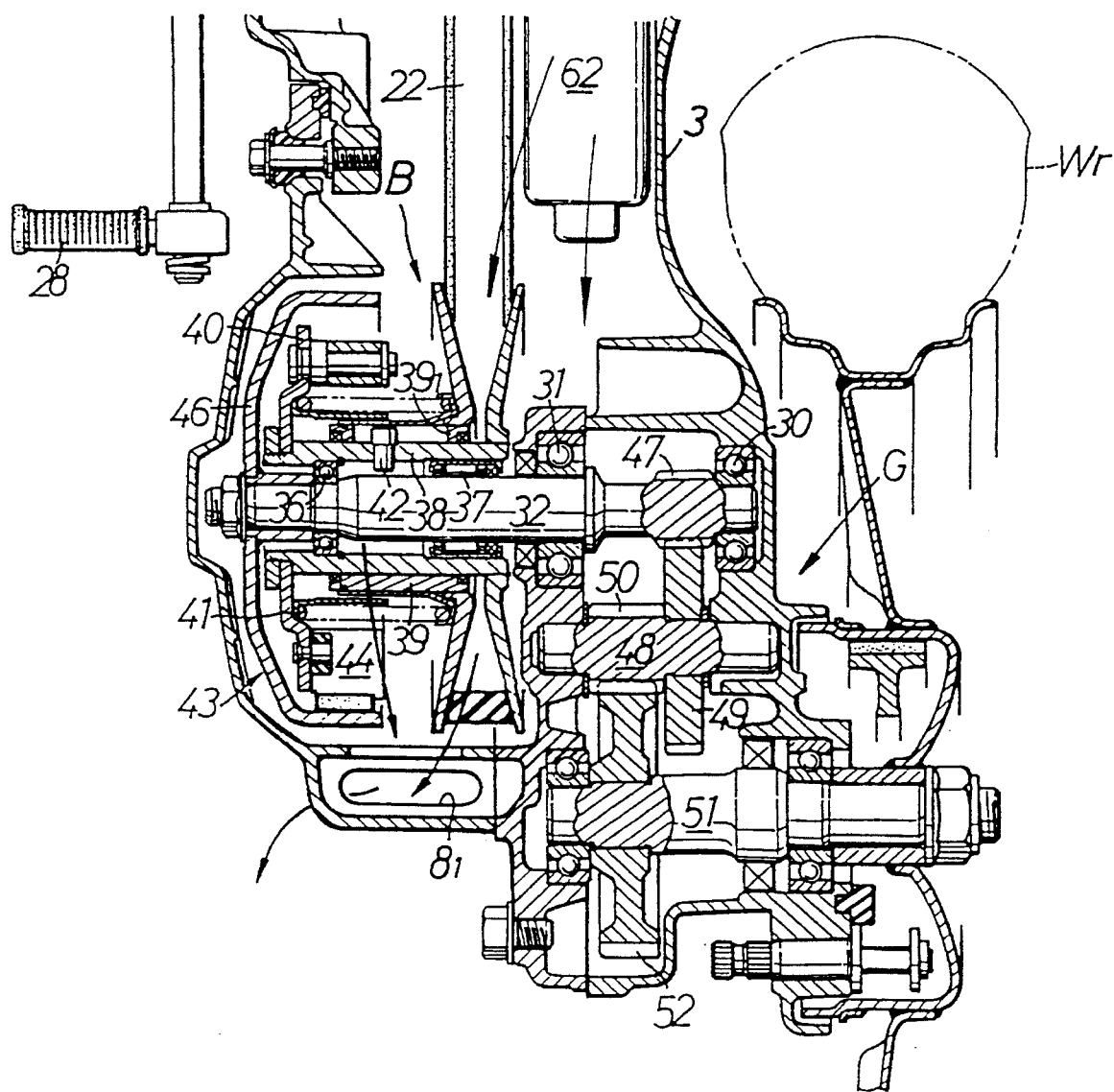
FIG. 19 is a second portion of the plan view.

FIGS. 18 and 19 illustrate a fourth embodiment of the present invention, wherein components corresponding to those in the previous first embodiment are denoted by like reference characters.

As can be seen from FIGS. 18 and 19, the fourth embodiment has a feature that a motor M is used as a travelling drive source in place of the engine E. More specifically, a substantially cylindrical motor housing 93 constituting an outer shell of the motor M is coupled to a front right side of the left case half 3 of the power unit P. An opening of the motor housing 93 at its right end is occluded by a lid member $93_1$. The motor M has a rotary shaft 94 which is carried through a ball bearing 95 mounted on the lid member $93_1$ and a ball bearing 96 mounted on a left end wall of the motor housing 93, and a cooling fan 97 is mounted on the rotary shaft 94. A driver 98 for controlling the driving of the motor M and a cup-like air intake chamber 99 for containing the driver 98 are clamped together by bolts on the right side of the lid member $93_1$ of the motor housing 93. Air is drawn through an air inlet port $99_1$ of the air intake chamber 99 by means of the cooling fan 97 to cool the driver 98 and is then passed through an air passage $93_2$ provided in the lid member $93_1$ to cool the motor M. And the air is further passed through an air passage $93_3$ provided in the left end wall of the motor housing 93 to a position inside the side cover 8 to cool the belt type continuously variable transmission B, and thereafter discharged to the outside through a discharge port $8_1$ which is provided at a rear end of the side cover 8.

The motor M is a DC (direct current) brushless motor and comprises a rotor 102 having a permanent magnet 101 disposed around an outer periphery of an iron core 100 secured to the rotary shaft 94, a stator 106 having a coil wound around an iron core 104 secured in the motor housing 93 by a bolt 103, and a rotor position sensor 109 comprised of a magnet 107 secured to the rotary shaft 94 and three hall devices 108 disposed in an opposed relation to an outer periphery of the magnet 107.

An accelerator opening degree signal produced by the accelerator opening degree sensor 79 and a signal indicative of the phase of the rotor 102 produced by the rotor position sensor 109 are input to a controller which is not shown. The controller controls field-effect transistors of the driver 98 to sequentially change over the electric current flowing through the stator 106, thereby rotatably driving the motor M with a predetermined power.

Although the embodiments of the present invention have been described above, it will be understood that the present invention is not limited to these embodiments, and various modifications and variations in design can be made without departing from the spirit and scope of the invention.

Figure 20A:
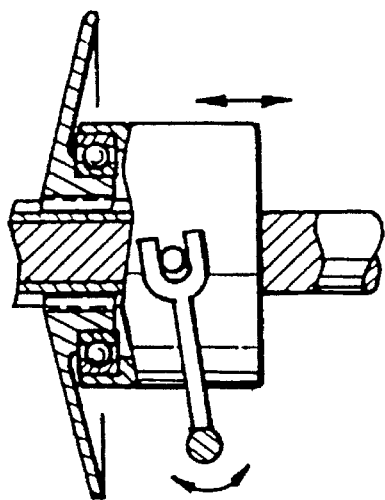
FIG. 20 is schematic views illustrating other embodiments of gear shift ratio changing means.
Figure 20B:
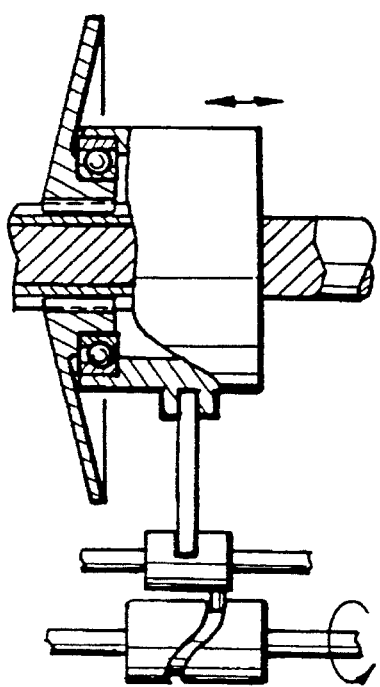
Figure 20C:
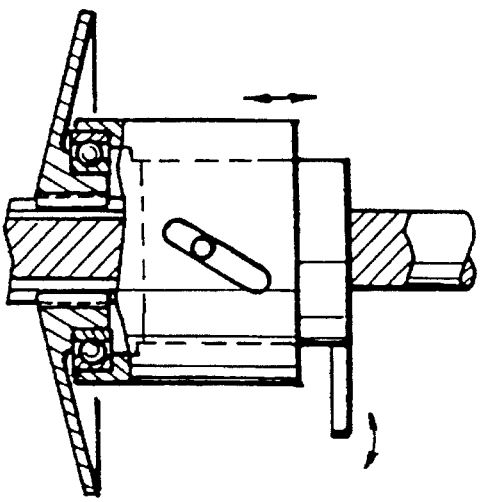

For example, although the motor 62 of the gear shift ratio changing means 61 is controlled on the basis of three signals indicative of the accelerator opening degree, the vehicle speed and the engine rotation speed, other signals, in addition to these signals, can be used for the control. Additionally, it is possible to use a hydraulic motor as an actuator for the gear shift ratio changing means 61. Further, for example, any of various cam mechanisms and fork mechanisms can be employed as the gear shift ratio changing means 61, as shown in FIG. 20.

What is claimed is:

1. A continuously variable transmission and power unit casing combination for a two-wheeled vehicle, the power unit casing enclosing and supporting both a travelling drive source and the transmission, the power unit casing being pivotally mounted on a body frame of the vehicle, the transmission comprising:

a driving pulley comprised of a stationary pulley half and a movable pulley half, both the drive pulley halves being mounted on an input shaft driven by the travelling drive source; a driven pulley comprised of a stationary pulley half and a movable pulley half, both the driven pulley halves being mounted on an output shaft; and an endless belt wound around the driving pulley and the driven pulley; and a gear shift ratio changing means for varying a gear shift ratio of the transmission by changing a width of a groove formed between the pulley halves of each of said pulleys by a driving force form a motor, wherein the transmission further includes a control means for controlling the gear shift ratio changing means for causing said changing of the widths of the grooves in both the pulleys in accordance with an operational condition of the travelling drive source, and said gear shift ratio changing means is contained within said casing with said motor being completely disposed in a space in said casing the space being defined by an oval viewed in a direction parallel to the axes of said input and output shafts, said oval formed by respective outer perimeters of said driving and driven pulleys and a pair of spaced and straight lines tangentially joining said outer perimeter of said driving pulley and said outer perimeter of said driven pulley.

2. An apparatus according to claim 1, wherein said gear shift ratio changing means is assembled as a unit which is detachably supported in said casing.

3. An apparatus according to claim 1, wherein said gear shift ratio changing means is supported in a floating relation to and with a spacing from said casing.

4. An apparatus according to claim 1, wherein the widths of said grooves in the pulleys is varied by said control means on the basis of at least a rotational speed of said travelling drive source, an accelerator opening degree and a vehicle speed.

5. An apparatus according to claim 4, wherein the width of said grooves in the pulleys is varied by said control means on the basis of a deviation between the rotational speed of the travelling drive source and a target rotational speed searched in a table based on the accelerator opening degree and the vehicle speed.

6. An apparatus according to claim 4, wherein an output characteristic of a potentiometer for detecting the accelerator opening degree is set in a non-linear pattern, thereby changing the shifting characteristic of the continuously variable transmission relative to the accelerator opening degree.

7. An apparatus according to claim 1, wherein the movable pulley half of said driven pulley is moved toward and away from the stationary pulley half by the gear shift ratio changing means, and the movable pulley half of the driving pulley is biased toward the stationary pulley half by a spring.

8. An apparatus according to claim 1, wherein said motor is disposed substantially within a portion of said space that is further defined as being within said endless belt as viewed in the direction of axes of said input and output shafts.

9. An apparatus according to claim 1 wherein said gear shift ratio changing means is assembled as a complete unit and detachably supported on said power unit casing by flexible vibration and sound absorbing means.

10. An improvement in a continuously variable transmission and power unit casing for a two-wheeled vehicle, the power unit casing enclosing and supporting both a travelling drive source and the transmission, and the power unit casing adapted to be pivotally mounted on a body frame of the vehicle, wherein the transmission includes:

a driving pulley comprised of a stationary pulley half and a movable pulley half with both the drive pulley halves being mounted on an input shaft driven by the travelling drive source, a driven pulley comprised of a stationary pulley half and a movable pulley half with both the driven pulley halves being mounted on an output shaft, and an endless belt wound around the driving pulley and the driven pulley the improvement comprising;

a gear shift ratio changing means for varying a gear shift ratio of the transmission by changing a width of a groove formed between the pulley halves of each of said pulleys, said gear shift changing means including a power source means for providing a driving force for causing said changing of the widths of the grooves, and said gear shift ratio changing means being contained within said casing with said power source means having a motor disposed in said casing in a space defined between said input shaft and said output shaft and adjacent said endless belt with said motor being intersected by a plane parallel to and passing through both said input shaft and said output shaft.

11. An improvement according to claim 10, wherein said gear shift ratio changing means is assembled as a complete unit which is detachably supported in said casing.

12. An improvement according to claim 10, wherein said gear shift ratio changing means is supported in a floating relation to and spaced from walls of said casing.

13. An improvement according to claim 10, wherein said endless belt has two portions extending between said drive and driven pulleys and said power source means is located substantially between, although laterally adjacent to, said two portions of said endless belt.

14. An improvement in a continuously variable transmission and power unit casing for a two-wheeled vehicle, the power unit casing enclosing and supporting both a travelling drive source and the transmission, the power unit casing being pivotally mounted on a body frame of the vehicle, wherein the transmission includes:

a driving pulley comprised of a stationary pulley half and a movable pulley half, both the drive pulley halves being mounted on an input shaft driven by the travelling drive source; a driven pulley comprised of a stationary pulley half and a movable pulley half, both the driven pulley halves being mounted on an output shaft and an endless belt wound around the driving pulley and the driven pulley the improvement comprising;

a gear shift ratio changing means for varying a gear shift ratio of the transmission by changing a width of a groove formed between the pulley halves of each of said pulleys, said gear shift changing means including a power source means for providing a driving force for causing said changing of the widths of the grooves, said gear shift ratio changing means being contained within said casing with said power source means disposed in said casing in a space defined between said input shaft and output shaft and adjacent said endless belt, said gear shift ratio changing means being assembled as a complete unit and detachably supported on said power unit casing by flexible vibration and sound absorbing means.

* * * * *